(12) United States Patent
Jephcott

(10) Patent No.: US 6,601,690 B2
(45) Date of Patent: *Aug. 5, 2003

(54) METHOD AND APPARATUS FOR TRANSFERRING DRIVE

(75) Inventor: David Lynton Jephcott, Shropshire (GB)

(73) Assignee: Scootabout International Limited, Shropshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,382

(22) PCT Filed: Apr. 18, 1997

(86) PCT No.: PCT/GB97/01081

§ 371 (c)(1),
(2), (4) Date: Feb. 1, 1999

(87) PCT Pub. No.: WO97/38928

PCT Pub. Date: Oct. 23, 1997

(65) Prior Publication Data

US 2002/0057956 A1 May 16, 2002

(30) Foreign Application Priority Data

Apr. 18, 1996 (GB) ................................ 9608088

(51) Int. Cl.⁷ .............................................. B65G 47/34
(52) U.S. Cl. .................................... 198/465.4; 198/349
(58) Field of Search .................... 414/390, 398, 414/809; 198/465.4, 683.1, 349, 350; 211/1.51, 1.57, 1.52; 53/255, 256, 391

(56) References Cited

U.S. PATENT DOCUMENTS

| 3,207,262 A | * 9/1965 | Berman ............... 198/465.4 X |
| 3,782,522 A | * 1/1974 | Wyers ................... 198/342 X |
| 4,840,124 A | * 6/1989 | Tadashima ........... 198/465.4 X |
| 4,977,996 A | * 12/1990 | Duce ................... 198/465.4 X |
| 5,056,438 A | * 10/1991 | Nozaki et al. ......... 198/349 X |
| 5,072,822 A | * 12/1991 | Smith .......................... 198/349 |
| 5,799,769 A | * 9/1998 | Heer et al. .................. 198/349 |

FOREIGN PATENT DOCUMENTS

| BE | 0203290 | * 12/1986 | ................ 198/349 |
| DE | 3801056 | * 7/1989 | ............. 198/465.4 |
| FR | 629093 A | 7/1963 | |
| FR | 2 551 166 A | 3/1985 | |
| JP | 4-189216 | * 7/1992 | ............. 198/465.4 |
| JP | 4-354721 | * 12/1992 | ................ 198/349 |

\* cited by examiner

Primary Examiner—James W. Keenan
(74) Attorney, Agent, or Firm—Renner, Otto, Boisselle, Sklar, LLP

(57) ABSTRACT

A drive-transferring apparatus has a constraining guide (10) carrying a plurality of drive-transferring members (11) interconnected compressively. Drive members (13a) drive the drive-transferring members (11) about the constraining guide (10). One or more elongate apertures, such as slots (13), permit access to the drive-transferring members for connection of further members thereto, as well as for reading data carried by the drive-transferring members (11) or by members connected thereto.

39 Claims, 19 Drawing Sheets

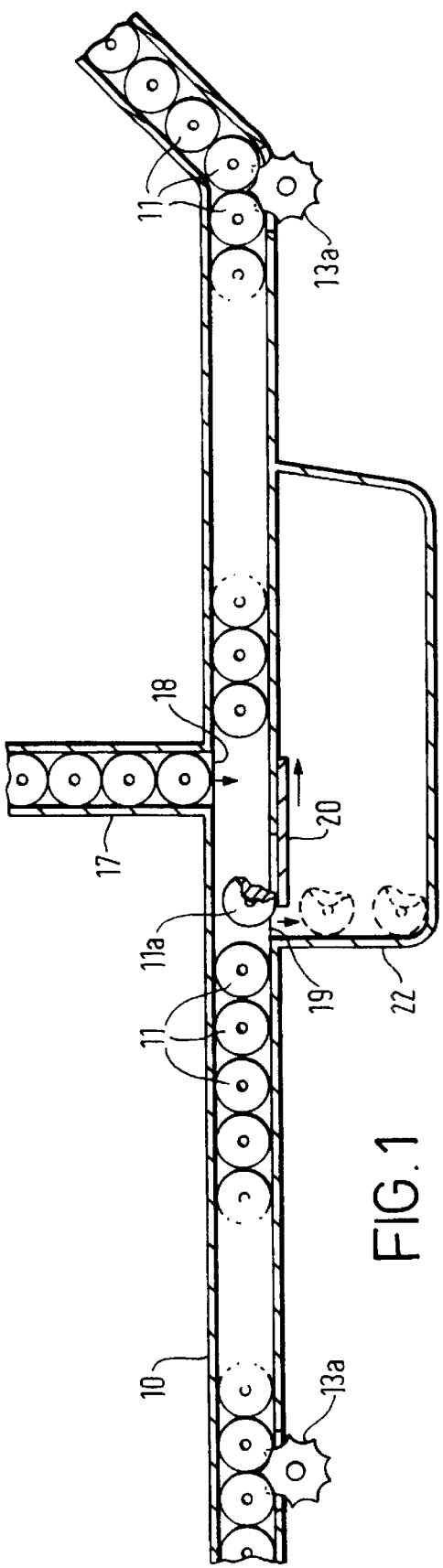
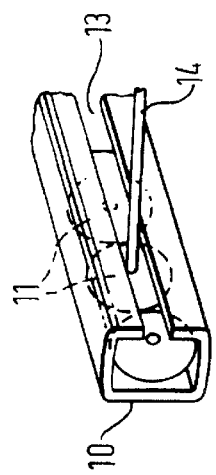
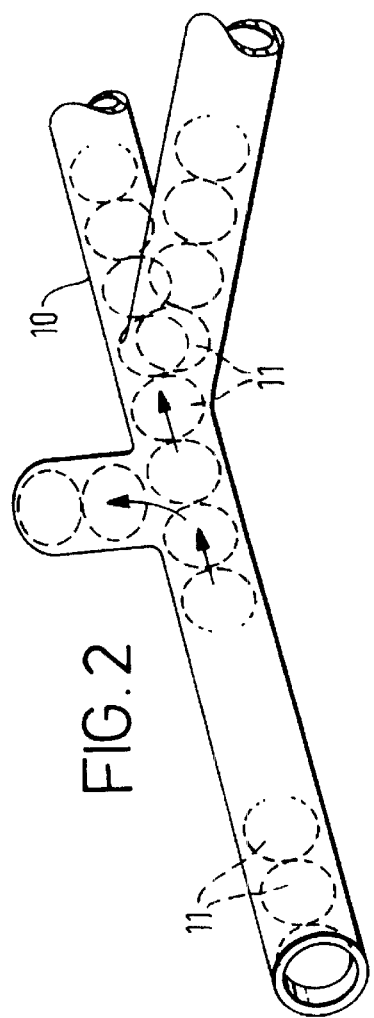

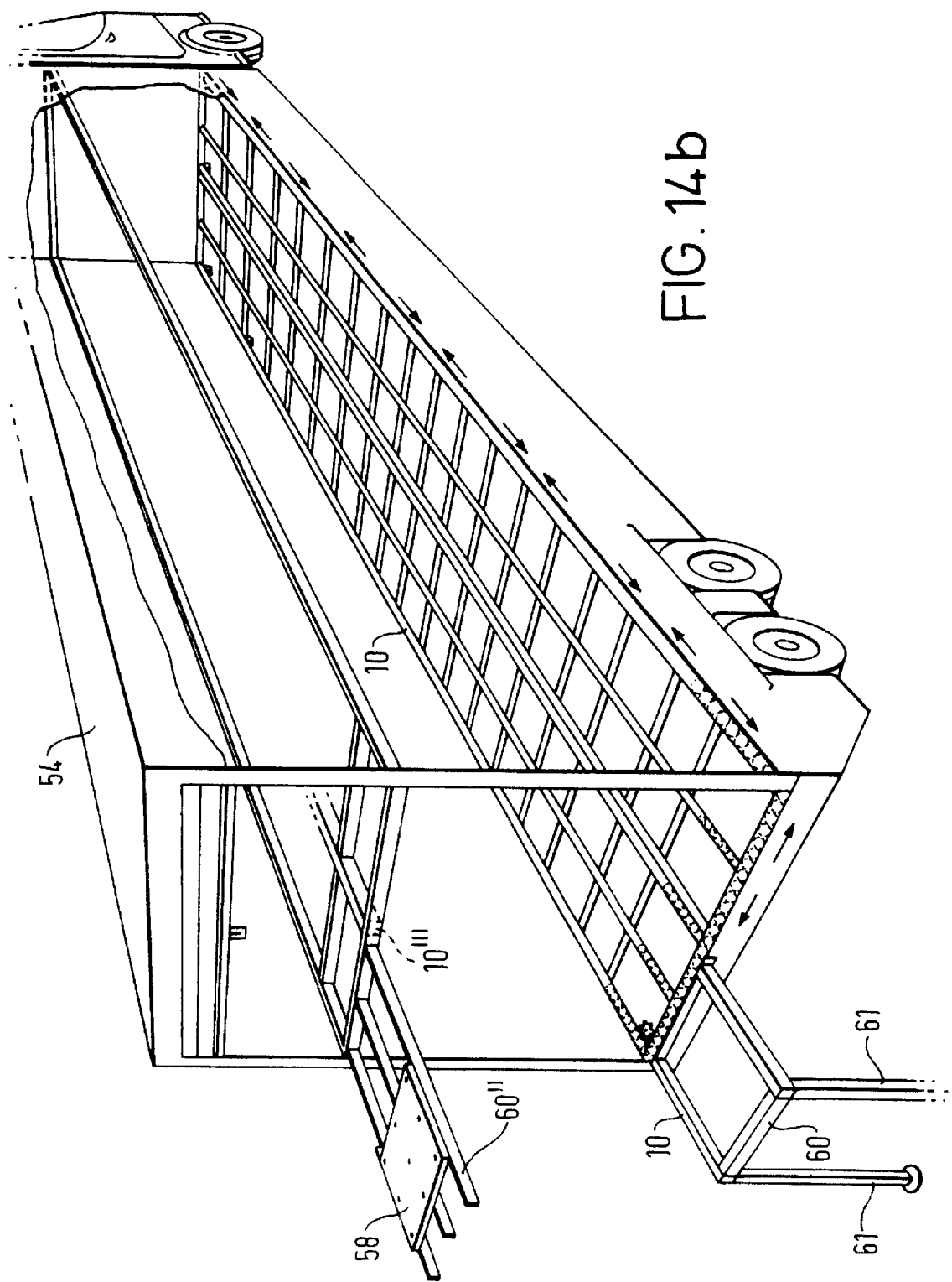

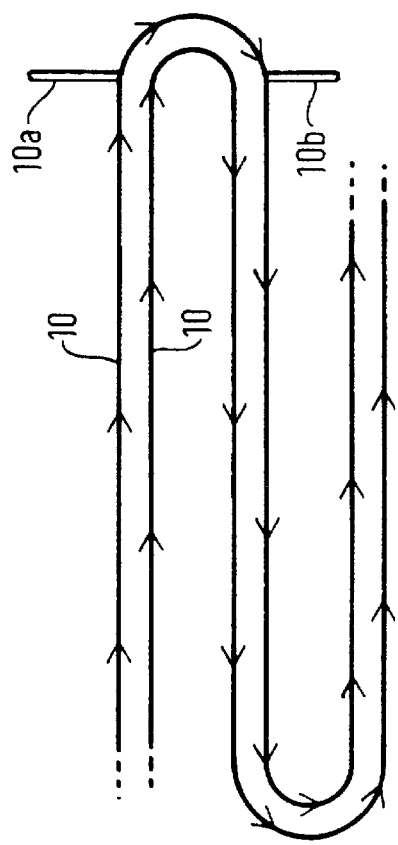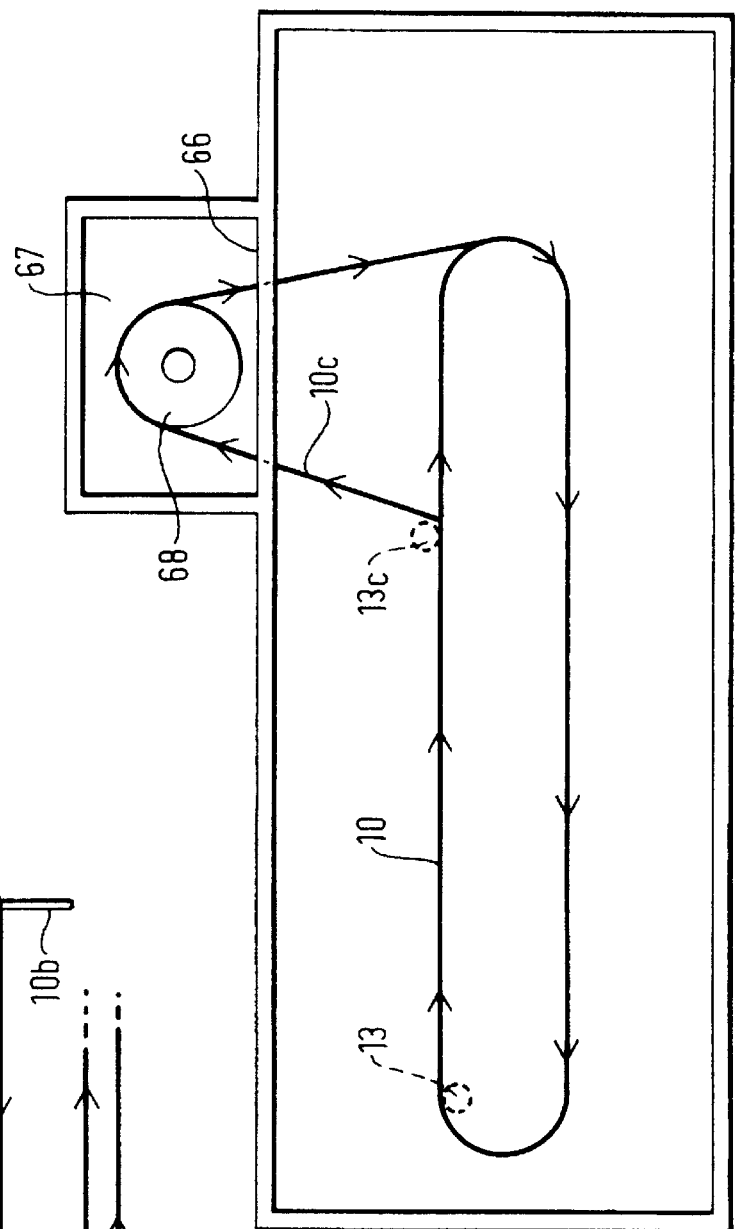
FIG. 18
FIG. 19

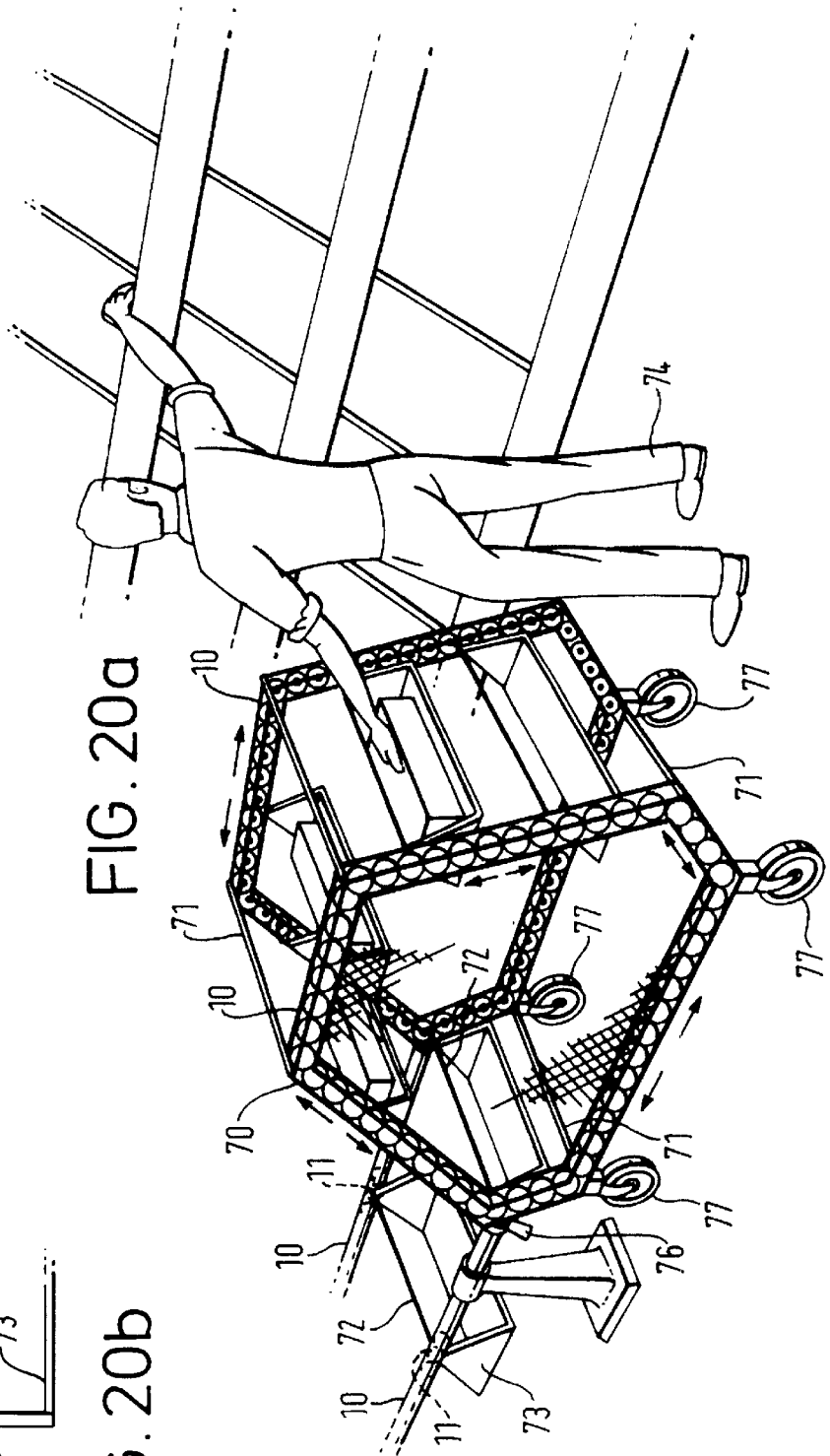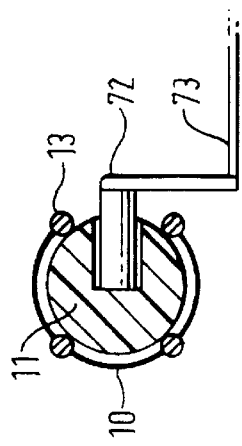
FIG. 20a
FIG. 20b

METHOD AND APPARATUS FOR TRANSFERRING DRIVE

This invention relates to a method and apparatus for transferring drive.

For many years it has been known to transfer drive by means of direct, permanent mechanical interconnections. An example of such an interconnection occurs when the output shaft of a motor is coupled directly to the member that the motor is intended to drive.

However, in many branches of industry it is commonly required to transfer objects over comparatively large distances and to apply drive at locations remote from eg a motor. It therefore is well known to employ drive-transferring apparatuses such as belts, chains and gear trains in order to achieve these aims.

However, all known drive-transferring technologies are associated with significant disadvantages.

For example, drive belts and drive chains rely on the imparting of tensile forces in order to transfer drive. In drive belts, the use of such forces causes gradual stretching of the belts. Similar effects are observed in drive chains over time.

Prolonged use of belts and chains leads to failure, as a result of friction and wear in the belt/chain members. Failure of a drive belt usually necessitates replacement of the entire belt; or at best a repair that significantly reduces the performance of the belt. Some belt and chain failures are dangerous, especially when fragments of such members are thrown from an apparatus at speed.

It is possible to replace individual links of a drive chain, but this is often a time-consuming process. Hitherto it has not been possible to automate the repair of a broken link in a drive chain.

Gear trains do not suffer from the same disadvantages as belts and chains; however, they are sill prone to wear; they are expensive to manufacture; and they generally require permanent installations including bearings secured to fixed datum points. Also, gear trains generally employ only rigid members and hence they lack some of the versatility inuring to belts and chains, that employ flexible members.

According to the invention in a broad aspect there is provided a drive-transferring apparatus comprising a constraining guide defining a drive-transfer path; and a plurality of drive-transferring members movably captive in the constraining guide; wherein (i) the constraining guide includes one or more apertures permitting access to one or more of the drive-transferring members; and (ii) the drive-transferring members are capable of transferring drive between discrete parts of the constraining guide by means of compressive interconnections.

This apparatus overcomes at least some of the disadvantages of the prior art.

In particular, the transferring of drive by compressive interconnection means that tensile failure of components of the apparatus is most unlikely to occur. Furthermore, the use of compressive interconnection means that the drive-transferring members need not be permanently connected together. This in turn means that individual drive-transferring members can readily be repaired or replaced in the apparatus, thereby obviating the difficulties associated with repair of drive belts and drive chains.

The failure modes of apparatuses according to the invention are safer than in the prior art. This is partly because the constraining guide can be designed substantially to enclose all the moveable parts of the device. Thus, component failure may be contained safely within the constraining guide, even when the apparatus is operating at high speed.

Additionally, the use of compressive interconnection means that parts of the apparatus are less likely to be thrown outwardly of the apparatus during failure.

The use of compressive interconnection also means that the drive-transferring elements can be made of materials and shapes inherently resistant to wear and damage yet which also are associated with low frictional forces, thereby improving the efficiency of the apparatus. Particularly suitable shapes for the drive-transferring members are spherical and spheroidal shapes.

All the components of the apparatus of the invention may if desired be manufactured from rigid materials. Thus, it is possible to produce a drive-transferring apparatus that is versatile in terms of the locations between which drive may be transferred; yet which does not suffer from the known disadvantages of flexible drive-transferring members such as belts and chains.

Another possibility is for e.g. the constraining guide to be flexible. This confers versatility on the apparatus of the invention. One preferred form of flexible constraining guide is a hose-like construction that may be formed into a variety of shapes while permitting movement of the drive-transferring members in the manner defined above.

Further, advantageous features of the invention are set out in claims 2–91 appended hereto.

In another broad aspect, the invention is considered to reside in a method of transferring drive comprising imparting motion to one or more of a plurality of drive-transferring members loosely captive in a constraining guide, whereby to cause compressive interconnection of a plurality of said members and thereby transfer drive in the constraining guide.

There now follows a description of preferred embodiments of the invention, by way of example, with reference being made to the accompanying drawings in which:

FIG. 1 is a schematic representation of a first embodiment of the invention;

FIG. 2 shows an optional branch in the constraining guide visible in FIG. 1;

FIG. 3 shows part of the FIG. 1 embodiment in more detail;

FIG. 1;

FIGS. 14a, 14b, 14c and 14d show arrays of constraining guides in vehicles;

FIGS. 18 and 19 show typical layouts of conveyors according to the invention;

FIGS. 20a and 20b shows a further vehicle including a three dimensional array of constraining guides;

Figure 4:
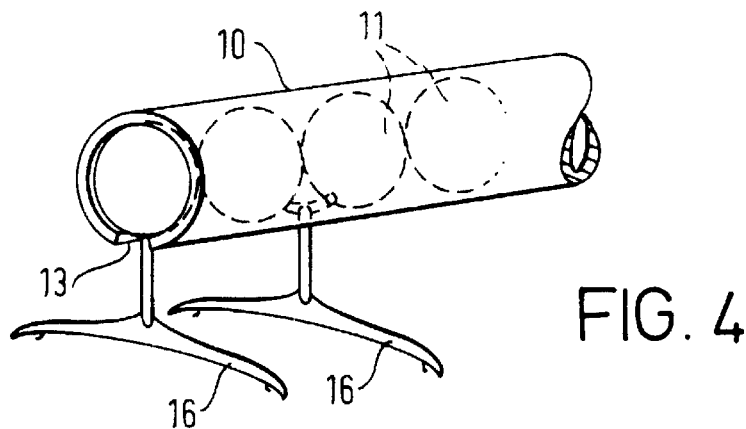
FIG. 4 is a variant on the FIG. 3 arrangement.

Referring to the drawings there is shown a constraining guide 10 in the form of tubular member. The tubular member 10 has a hollow, elongate interior substantially filled with a line of contiguous bead-like drive-transferring members 11. A driven member shown schematically at 13 protrudes through the wall of constraining guide 10 and imparts drive to successive drive-transferring members 11. This causes drive to be transferred along the constraining guide 10 in a compressive manner.

Driven member 13 protrudes through an aperture in the wall of constraining guide 10. A similar aperture may be provided at a location remote from driven members 13, whereby drive may be taken from the apparatus if desired. Apertures may be formed in the wall of constraining guide 10 at virtually any desired location. The apertures may, if desired, be closable eg by means of automatic or manually operated closures. One form of closure is described below in relation to a drive-transferring member ejection apparatus.

The driven member 13 may be a star wheel as shown schematically in FIG. 1, or may be a drive screw. Numerous other, equivalent arrangements may also be employed for imparting linear motion to the drive-transferring members 11. Nonetheless, a driven member 13 that converts rotary motion (eg from an electric motor) to linear motion is preferred.

As is evident in FIGS. 3 and 4, constraining guide 10 may include an elongate slot 13. This permits access to one or more of the drive-transferring members 11 along a lengthy portion of the constraining guide 10. This in turn permits one or more further members to be engaged with the line of contiguous members 11, thereby giving rise to a transport apparatus.

In the FIG. 3 embodiment, the constraining guide 10 is generally rectangular in cross-section, with the elongate slot 13 formed in one of the vertical sides of the guide 10. This permits a member such as rod 14 connected to a member 11 to protrude generally horizontally from the apparatus. This in turn permits articles to be carried on the apparatus by means of suspension from rod 14.

If desired, a second constraining guide 10 that is the mirror image of constraining guide 10 shown in FIG. 3 may be disposed to provide support at each end of rod 14. It is believed to be desirable, but not essential, for the mirror image constraining guide 10 to contain a plurality of members such as the drive-transferring members 11. However, such members need not necessarily be driven as in the embodiment of FIG. 1, and could under some circumstances be dispensed with entirely so that the further constraining guide serves simply as a support for the otherwise free end of rod 14.

In the FIG. 4 embodiment, the elongate slot 13 extends along the bottom of a generally circular cross-section constraining guide 10. This permits the carrying of a plurality of hangers 16. This version of the invention may be of utility in the garment manufacturing and/or warehousing industries.

As is evident from FIGS. 1, 3 and 4, the drive-transferring members are spheroidal in shape. Thus, they are well suited for transferring drive by means of compressive interaction. Furthermore, the members 11 roll easily within the guide 10, thereby minimising wear and friction.

However, the members 11 may be of numerous other shapes including completely spherical; cylindrical and even polygonal.

In the embodiments of FIGS. 1, 3 and 4 a plurality or indeed all of the members 11 include an aperture and a detent for securing to a further member such as rod 14 or hanger 16.

Figure 5:
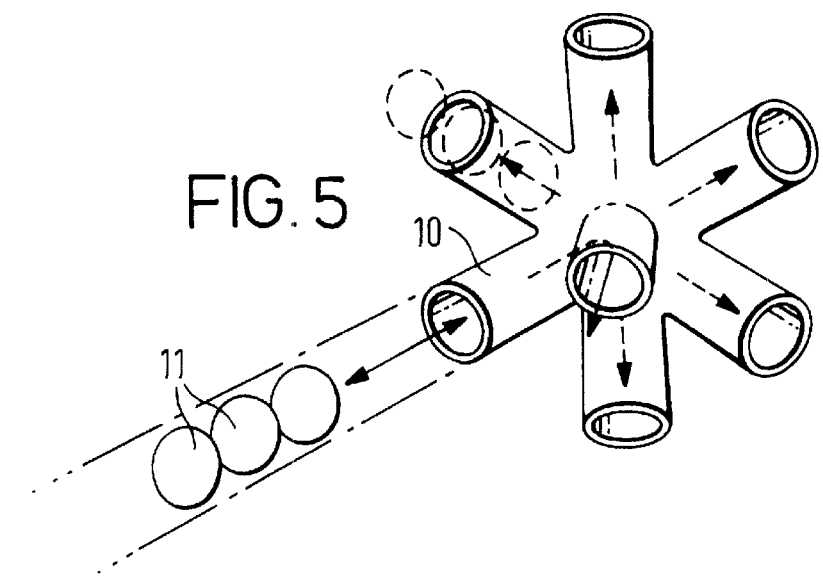
FIG. 5 shows one form of multiple branching of the constraining guide visible in eg.

FIGS. 2 and 5 show that the constraining guide 10 may be branched in a number of ways, whereby to transfer drive to several locations simultaneously. If necessary, the branch lines of the constraining guide 10 may include further driven members such as member 13a shown schematically in FIG. 1. The further driven members may, in common with the driven member 13, take a variety of forms according to the arrangement of the apparatus.

FIG. 1 shows a further branch 17 in the guide 10, for replenishing the guide 10 with members 11. Branch 17 may be constituted as a spring-loaded store of members 11 separated in normal use of the apparatus from the remainder of guide 10 by a moveable wall shown schematically at 18 in FIG. 1. If it is necessary to increase the number of members 11 within the guide 10, the wall 18 may be removed either by an automatic mechanism or manually in order to allow one or more additional members 11 to be dispensed from branch 17 into the main part of guide 10.

FIG. 1 also shows a closable aperture 19 that may be employed for selectively removing members 11 from the main part of guide 10. This may be required, for example when a member 11a becomes damaged or broken.

In the embodiments shown, aperture 19 includes a slidable cover 20 that may be withdrawn to one side to allow the damaged member 11a to fall into a receptacle 22 secured to the underside of constraining guide 10.

Instead of a receptacle, the damaged member 11a may enter a conveyor for removing it to a waste receptacle or repair area.

Figure 6:
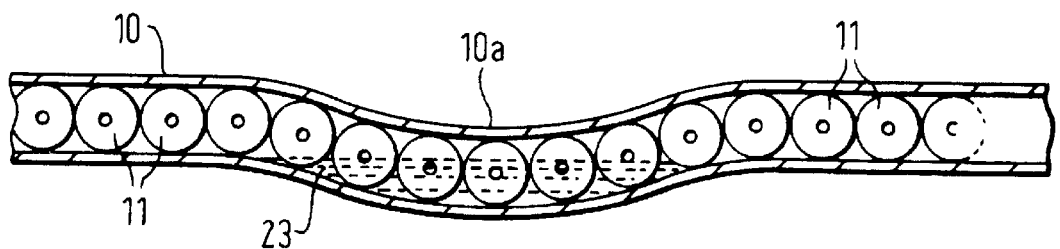
FIG. 6 shows an arrangement for lubricating part of the FIG. 1 embodiment.

FIG. 6 shows an optional portion of guide 10 formed as a downwardly extending curve 10a. This portion of the constraining guide 10 contains a pool of lubricant 23. Thus, drive-transferring members 11 passing through the portion of guide 10 shown in FIG. 6 automatically receive a coating of lubricant.

Curved portion 10a need not be present if the materials chosen for the components do not require lubrication by immersion in a liquid. For example, the materials of the mutually engaging parts of the drive-transferring members and the constraining guide may be chosen to have a low coefficient of friction. Another possibility is for the drive-transferring members, and/or the relevant parts of the constraining guide to be impregnated, coated or otherwise treated with a lubricant.

Downwardly directed curves 10a may be located at appropriate points along the guide 10 in order to provide lubrication for the members 11 throughout the apparatus. If desired, the portion 10a may be automatically or manually refillable with lubricant, eg by means of suitable apertures.

The drive members 11 may be manufactured from any of a variety of materials. However, it is envisaged that a generally rigid copolymer would be most appropriate in terms of cost and durability. The material of the drive members 11 can be chosen to have a low coefficient of friction with the constraining guide 10.

The guide 10 may typically extruded eg from aluminium or an aluminium alloy; however, a number of other materials, including flexible materials, may also be used.

The sliding cover 20 shown in relation to aperture 19 (which may also be employed on other apertures in the apparatus) may be motorised eg by means of a solenoid actuator itself operated under the control of an optical or other sensor.

The constraining guide 10 is shown in the drawings to be an open-ended elongate device. However, it is most likely that in practical embodiments of the invention the constraining guide 10 would constitute a closed loop whereby to avoid the need for constant replenishment of the members 11. However, in applications where the drive to the transferred is reciprocatory, it may be desirably economical to employ an open-ended constraining guide 10 as shown.

Figure 7:
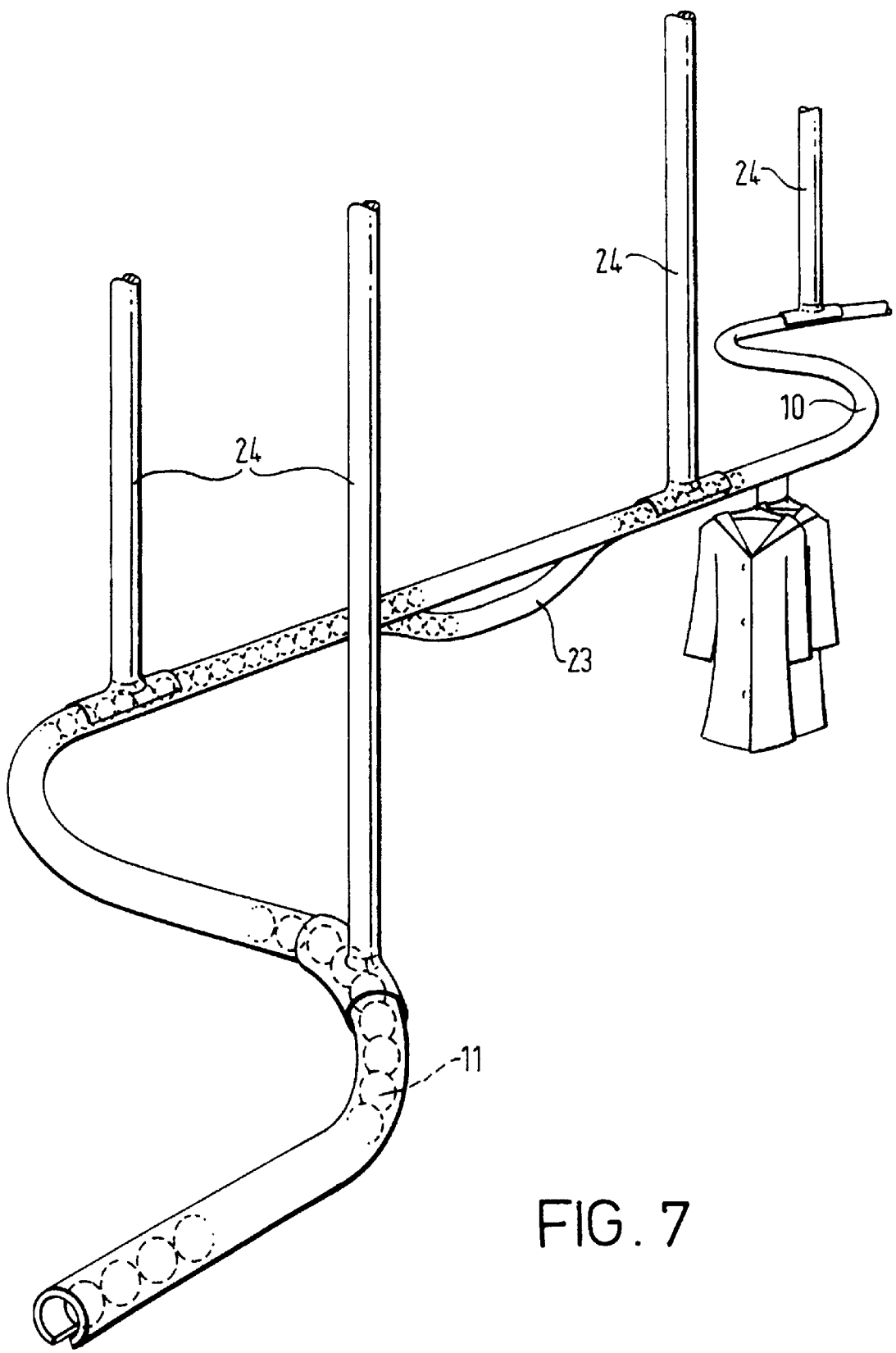
FIG. 7 is a variant on the FIG. 6 arrangement.

As shown in FIG. 7, the constraining guide 10 may be shaped in a variety of ways to accommodate obstacles, etc. in a warehouse or factory.

The constraining guide 10 may be supported at intervals, eg. by suspenders 24 extending downwardly from the ceiling of a building.

The lubricating trough or pool 23 of FIG. 6 is also visible in FIG. 7. There is, in addition, a bypass path for the constraining guide 10 so that the drive-transferring members 11 need only enter the lubricating trough 23 as necessary. Controlling gates (examples of which are described hereinbelow) may be employed selectively to divert the drive-transferring members through the lubricating trough 23 as desired.

Figure 8:
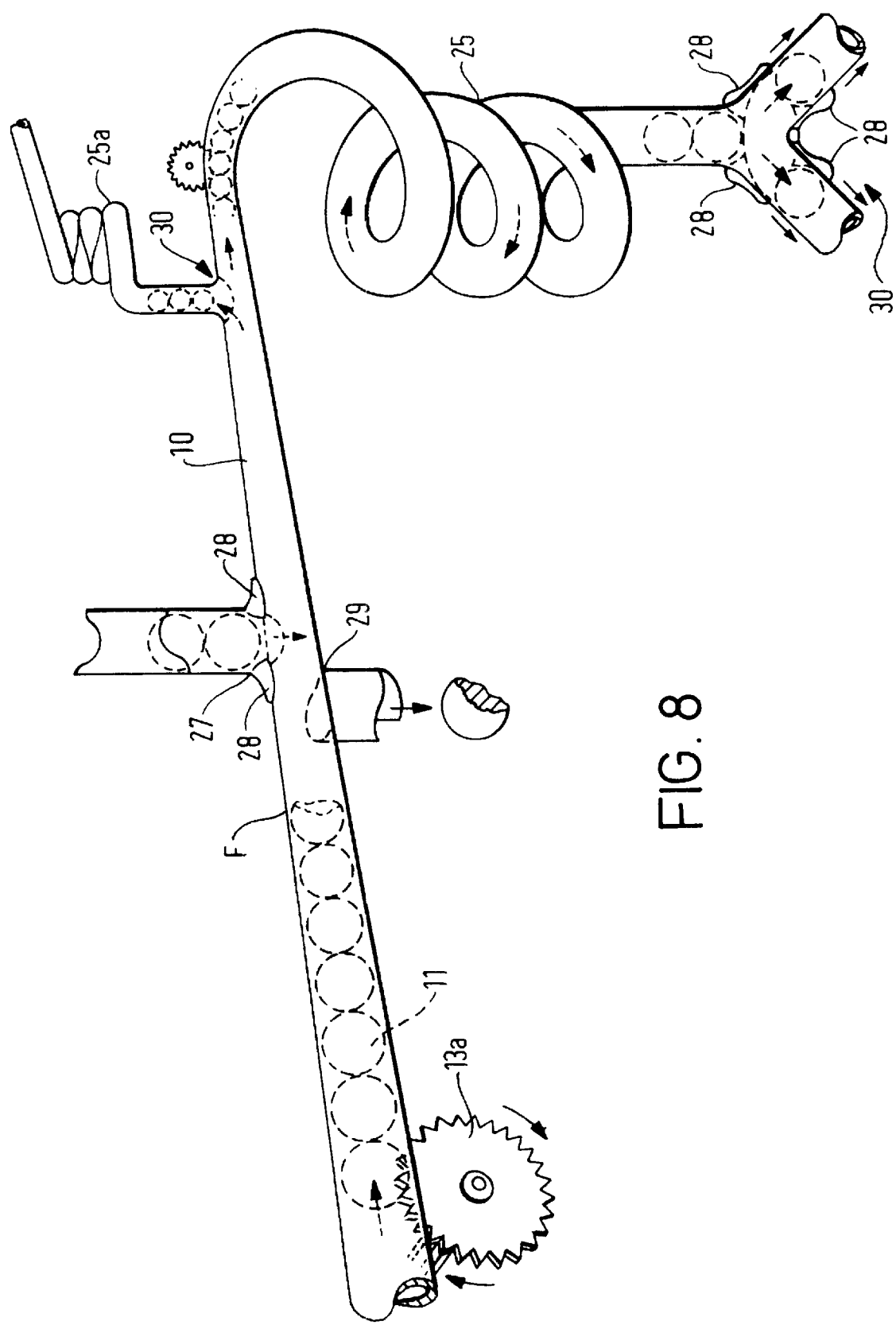
FIG. 8 shows some further optional features of the invention.

FIG. 8 shows some further ways in which the constraining guide 10 may be formed. As shown at 25a and 25b, the constraining guide may be formed into coils for encircling a further component eg. a sensor for detecting the presence of the drive-transferring members 11.

The drive member 13a is shown schematically protruding through the wall of constraining guide 10 in FIG. 8.

FIG. 8 also shows a branch 27 in the constraining guide, included for the purpose of replenishing the constraining guide 10 with drive-transferring members 11 as necessary.

Gate members 28 protruding through the wall of constraining guide 10 in the vicinity of junction 27 are laterally slideable selectively to open and close the junction 27 and thereby allow one or more fresh drive-transferring members 11 to fall into the constraining guide 10.

Similar gate members may be installed at a further junction 29 for the purpose of selectively removing drive-transferring members 11 from constraining guide 10.

A detector of fractures or other failures in the drive-transferring members 11 may be operative at point F in FIG. 8 to cause opening of the junction 29 and ejection of drive-transferring members when faults in the drive-transferring members 11 are detected.

Gate members 28 moveable for selective interposing in the paths of the drive-transferring member 11 may also be supplied at branches such as 30. Computer control of the gate members permits guiding of the drive-transferring members along a selected branch of constraining guide 10.

Figure 9:
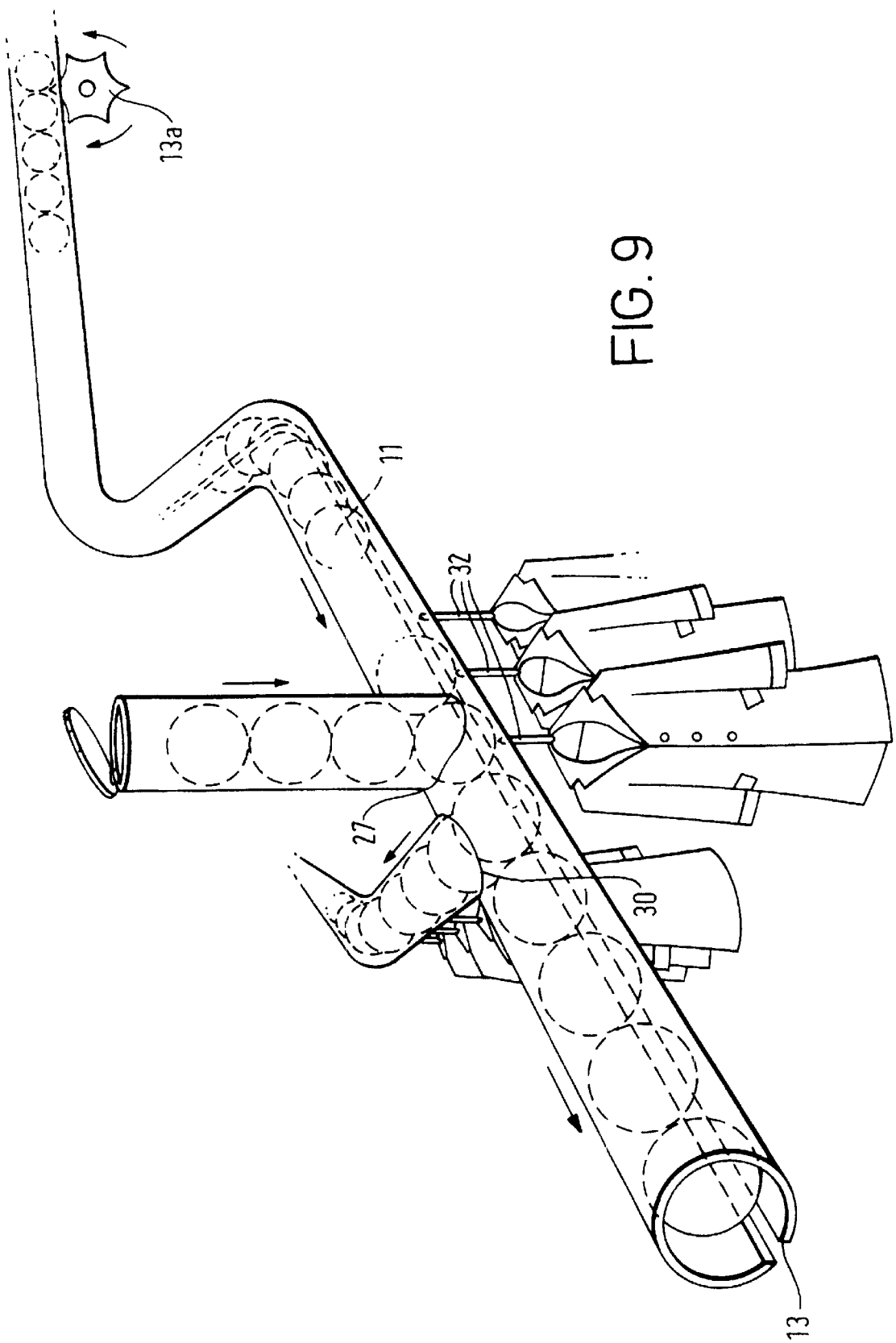
FIG. 9 shows the apparatus of the invention configured for garment distribution.

FIG. 9 shows a specific example of this form of the invention, in a garment distribution warehouse. A plurality of garment hangers 32 are secured to the drive-transferring members 11 via the elongate slot 13. A junction such as 27 of FIG. 8 allows replenishment of drive-transferring members as necessary. A further junction such as 30 allows diverting of the garments to a predetermined destination.

If desired, the drive-transferring members may be encoded as described in detail below in order to predetermine their path along the constraining guide 10.

In the FIG. 10, various forms of the constraining guide 10 and drive-transferring member 11 are shown.

Figure 10A:
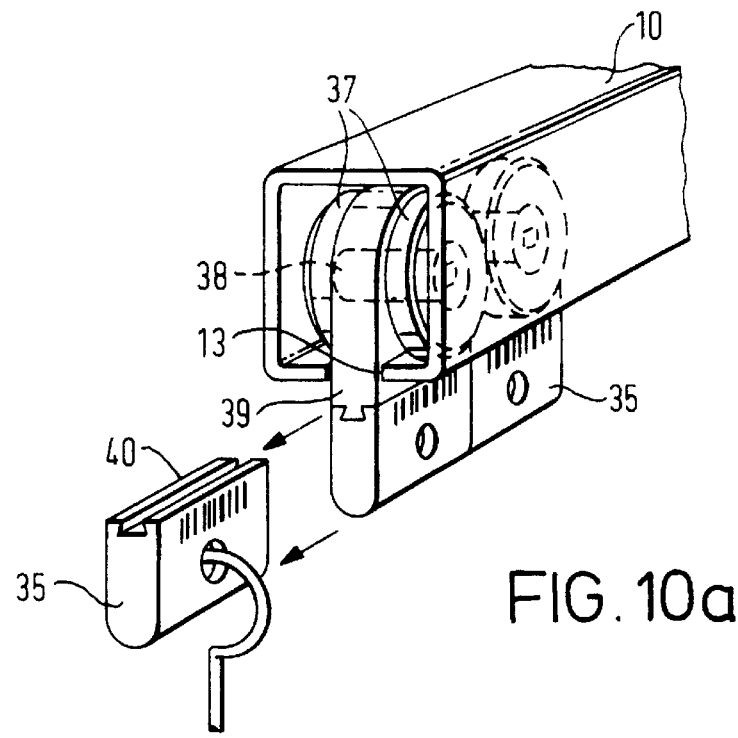
FIGS. 10a–10f show various embodiments of the constraining guide.

In FIG. 10a, constraining guide 10 is an elongate, hollow, square section member having an elongate slot in its lower face.

Figure 10B:
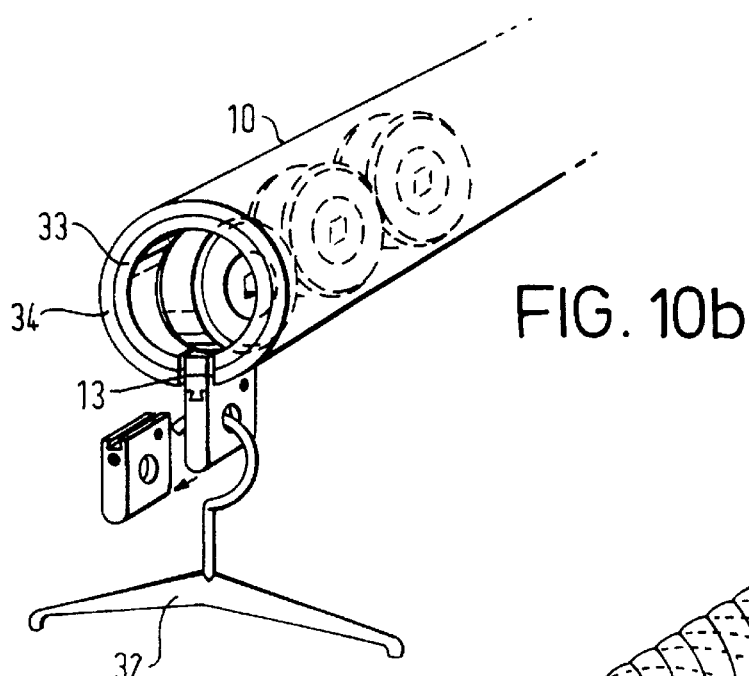

In FIG. 10b, constraining guide 10 comprises an inner, elongate, hollow tubular member 33 surrounded by an outer such member 34. Elongate slot 13 passes through both tubular members 33 and 34. Thus it is possible to employ drive-transferring members as shown having one or more downwardly projecting portions 35.

Figure 10C:
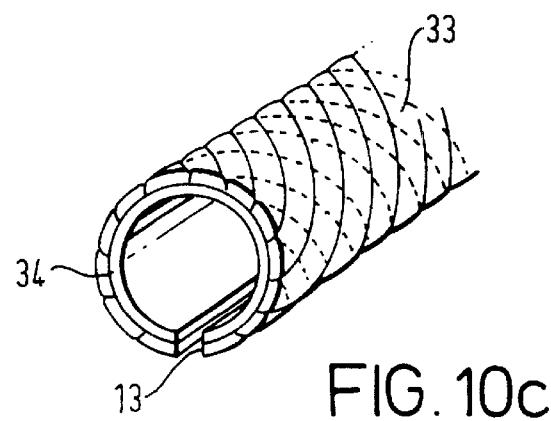
Figure 10D:
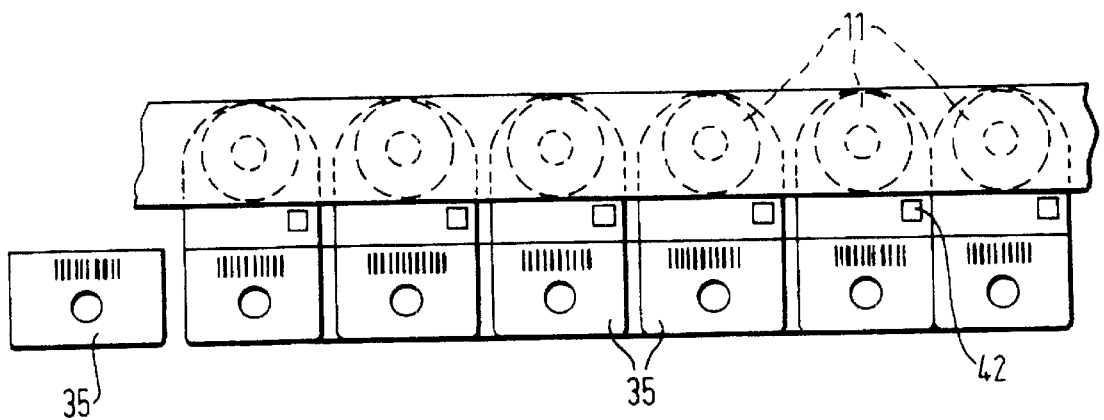

In the preferred embodiment, the inner tubular member 33 has a low coefficient of friction with the parts of the drive-transferring members 11 with which it is in contact. Outer tubular member 34 is preferably of a rigid material, and as shown in FIG. 10c may be armoured or otherwise strengthened.

The drive-transferring members 11 may in this embodiment comprise a pair of rollers 37 spaced from one another and mounted on a common axle 38. A central member 39 of approximately rectangular shape occupies the space between the rollers 37. Axle 38 passes through an aperture in central member 39.

Downwardly projecting member 35 is releasably secured to a portion of central member 39 extending a short distance beyond slot 13.

Downwardly projecting member 35 includes an aperture for receiving eg. the hook of a garment hanger 32. Downwardly projecting member 35 is encoded eg. by means of a bar code 40, by implanting of a radio frequency identification tag or in another optical, audible or otherwise transmissible manner.

This embodiment of the invention is of particular use during product manufacture and distribution. On manufacture of a garment, it is hung on a hanger 32 the hook of which is inserted into the aperture of a member 35. This member 35 may then remain uniquely associated with the product on hanger 32 during its transport via an apparatus according to the invention to eg. the interior of a lorry, for subsequent distribution to a warehouse or retail unit.

During this process the bar code or other code 40 may be read periodically to ensure correct routing of the drive-transferring member to which the downwardly projecting member 35 is secured. Such routing may be achieved through operation of the gate members 28 described hereinabove in the apparatus of the invention.

When the garment reaches a final or intermediate destination, the downwardly projecting member 35 may be removed from the drive-transferring member. In the embodiment shown this is achieved through use of a slidable dovetail joint, but other methods of releasably securing the downwardly projecting member may also be employed.

After removal of the downwardly projecting member 35, the drive-transferring member 11 to which it was formerly attached may be recycled within the constraining guide for receipt of another downwardly projecting member 35; alternatively the drive-transferring member 11 may be passed to a reservoir before subsequent use.

Figure 10E:
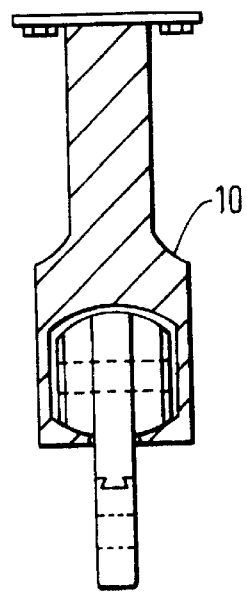
Figure 10F:
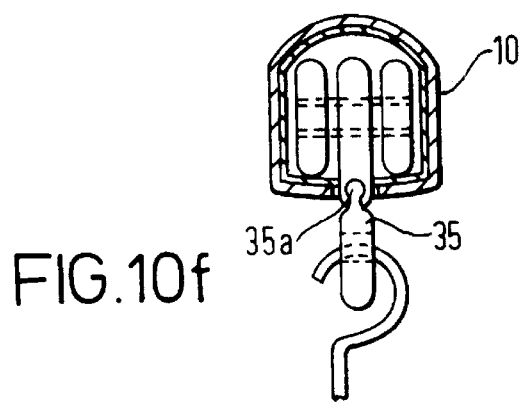

FIGS. 10e and 10f show alternative profiles for the constraining guide 10.

FIG. 10f also shows a ball and socket joint 35a for connection of the downwardly projecting member 35. Such a joint permits rotation about a vertical axis. This may be of benefit in some manufacturing and distributing environments.

In the FIG. 10b embodiment, each drive-transferring member 11 includes a radio frequency identification tag 42 that remains secured to the drive-transferring member 11 after removal of the bar coded downwardly projecting member 35 as shown. Such an arrangement permits controlled recycling of the drive-transferring members 11.

Figure 11:
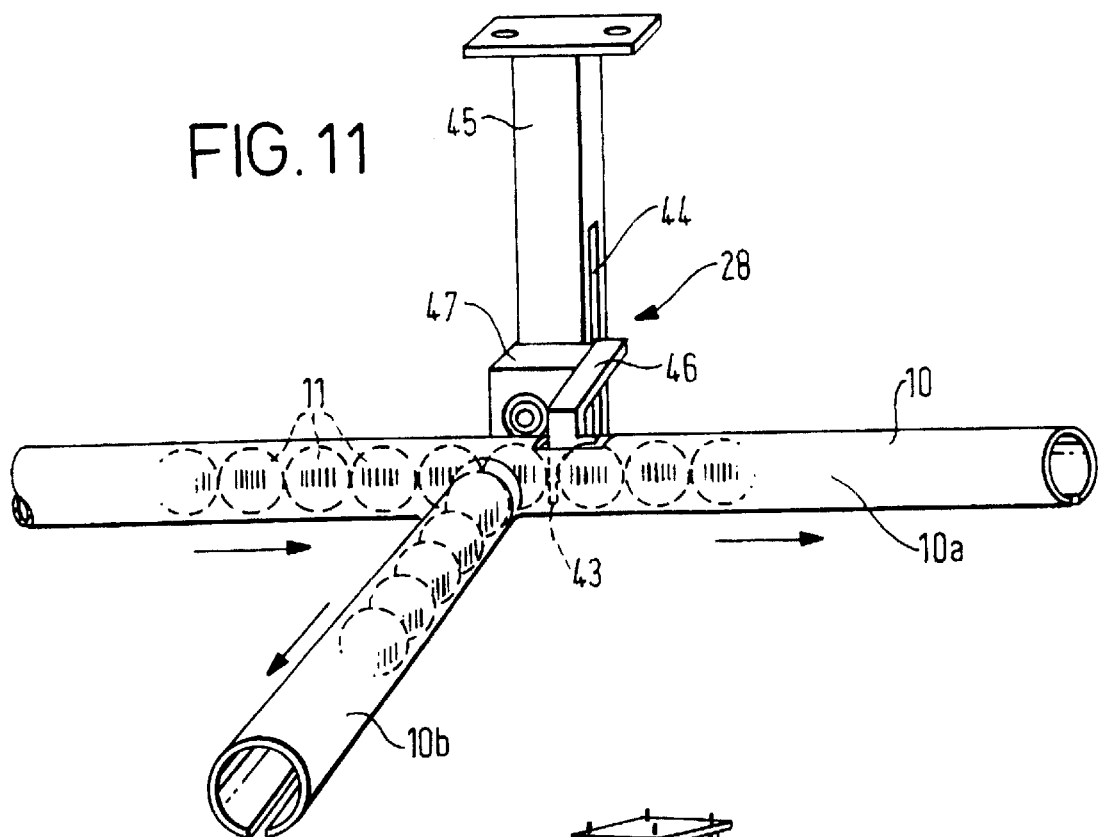
FIG. 11 shows an apparatus for controlling drive-transferring members at a junction.

FIG. 11 shows an alternative form of the gate members 28 controlling the flow of drive-transferring members in the constraining guide.

In this arrangement the gate 28 comprises a blade 43 slidably mounted via an elongate slot 44 on a pillar 45 itself rigidly secured relative to the constraining guide 10.

A connection member 46 interconnects blade 43 and slot 44.

A bar code reader 47 is mounted forwardly of pillar 45 for reading bar codes associated with the drive-transferring members 11. In this case, the drive-transferring members are all spherical and have the relevant bar codes printed on their bodies.

The spherical members may be weighted to ensure that the bar codes are correctly oriented.

The blade 43 may be interposed under the action of eg. a solenoid or other motive device when the bar code reader determines that the branch 10 of FIG. 11 is to be closed, and that the drive-transferring members are to travel under the influence of a driven member 13 along the branch 10b.

The bar code reader 47 may of course be linked to a suitable control device such as a microprocessor.

Figure 12A:
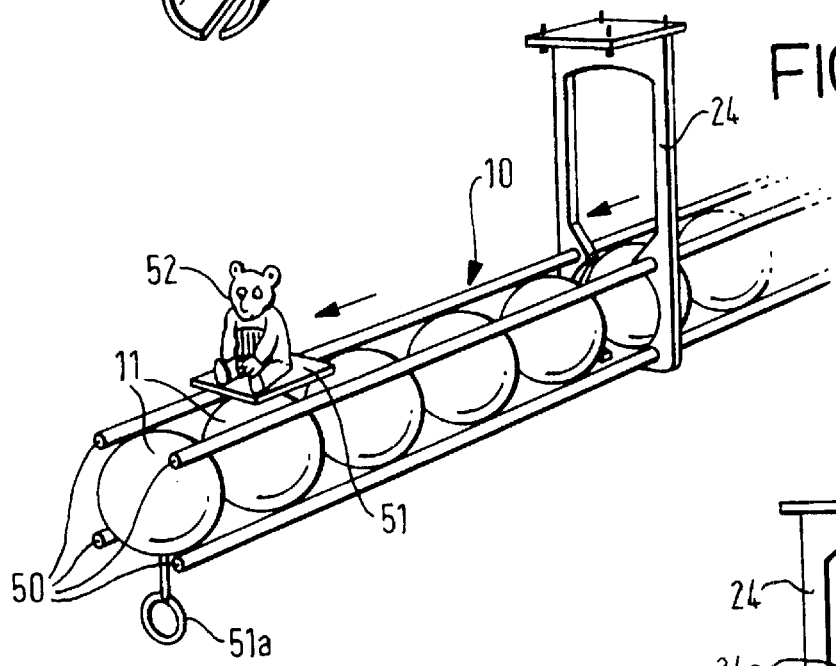
FIGS. 12a and 12b show an alternative form of the constraining guide.
Figure 12B:
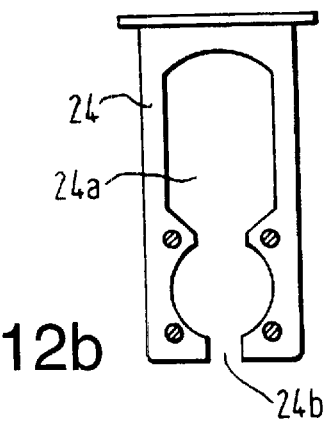

In FIGS. 12a and 12b, there is shown an alternative form of the constraining guide. This constraining guide comprises (in the embodiment shown) four rod-like members 50 that extend parallel to one another in a square pattern, to define a comparatively open cage for constraining the drive-transferring members 11 that are again in this embodiment spherical.

In this embodiment the drive-transferring members may respectively be secured to a load support 51 that engages the associated drive-transferring member via the space between two adjacent rod-like members 50. In such an embodiment, the suspender 24 for the constraining guide 10 may encircle the rod-like members 50 as shown and may include one or more apertures 24a, 24b permitting passage therethrough of the support member 51 and any goods 52 supported thereby.

An alternative, downwardly projecting support member 51a is also shown in FIGS. 12a and 12b. Aperture 24b in suspender 24 accommodates travel of such a member.

Figure 13:
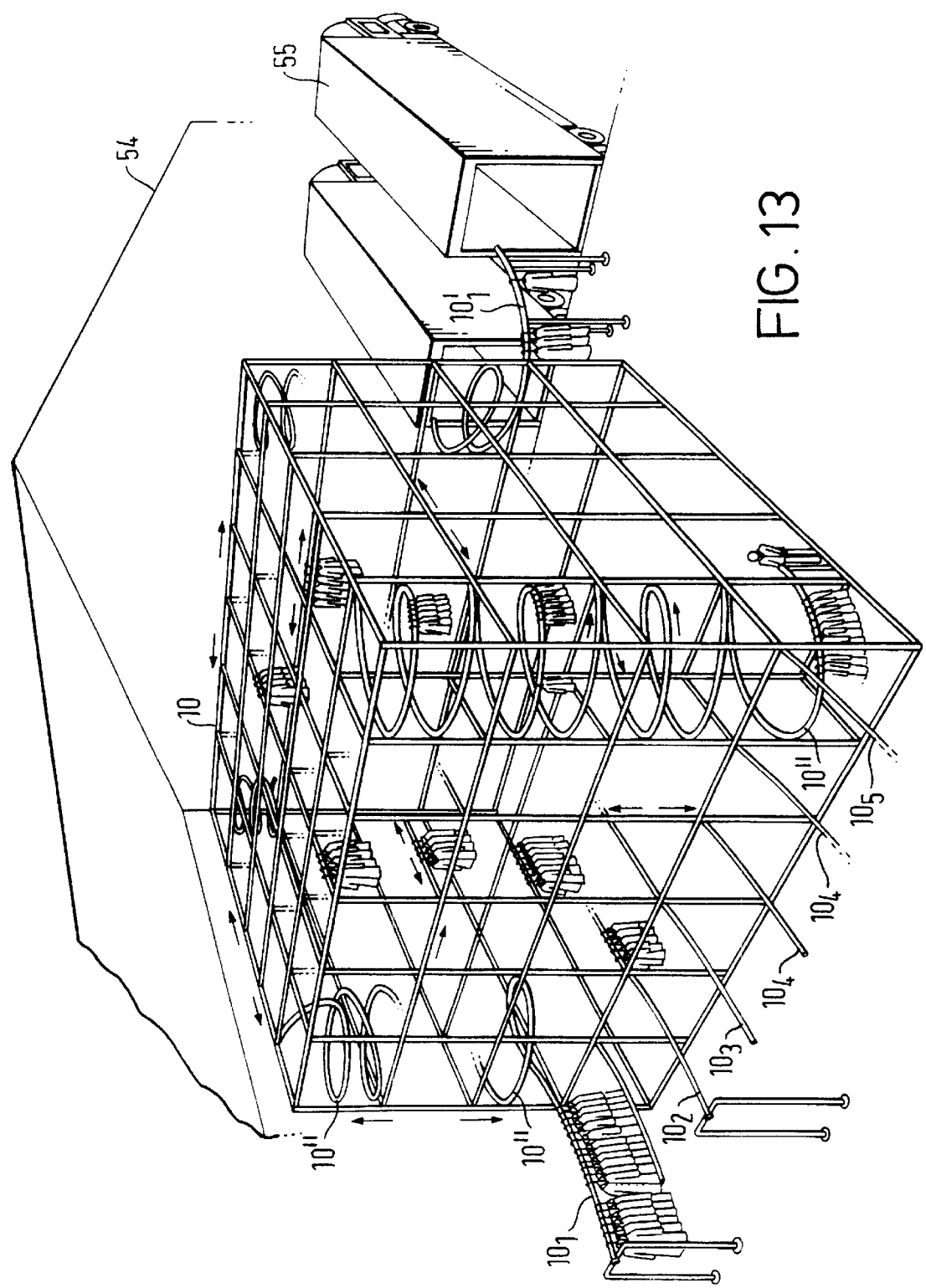
FIG. 13 shows a three-dimensional array of constraining guides installed in a warehouse.

In FIG. 13, there is shown a three dimensional array of constraining guides 10, installed within a warehouse 54.

Portions $10_1$, $10_2$, $10_3$, $10_4$, etc of the constraining guide 10 are open ended on one side of the three dimensional array of constraining guides, for receipt of eg. garments or other goods transported by the apparatus of the invention. Such goods may be delivered eg. by lorry or other vehicle from a factory or another distribution centre.

The goods transported on the apparatus fed into the array via the open ended portions may be transported to any suitable storage point within the three dimensional array as indicated schematically. If desired, spiral portions 10" of the constraining guide may be employed to raise or lower goods as desired. The use of such spiral portions brings the goods into contact with a plurality of further parts of the array.

Crossings of portions of the constraining guide 10 may include junctions such as 27, 29 or 30 previously described, in order to provide for routing of individual goods to any preferred location within the array in dependence on the encoding of such goods.

Further, open-ended portions of the constraining guide $10'_1$, etc may be provided in a dispatch area preferably located on the opposite side of the three dimensional array. The goods to be dispatched may be transported into vehicles such as those shown in FIG. 13 for onward dispatch to further distribution centres, retail units or other locations.

A computer control system may be employed to ensure routing of the goods within the three dimensional array, according to encoding of either the drive-transferring members 11 or members attached thereto. This will allow significant reductions in staffing levels at warehouses.

Figure 14A:
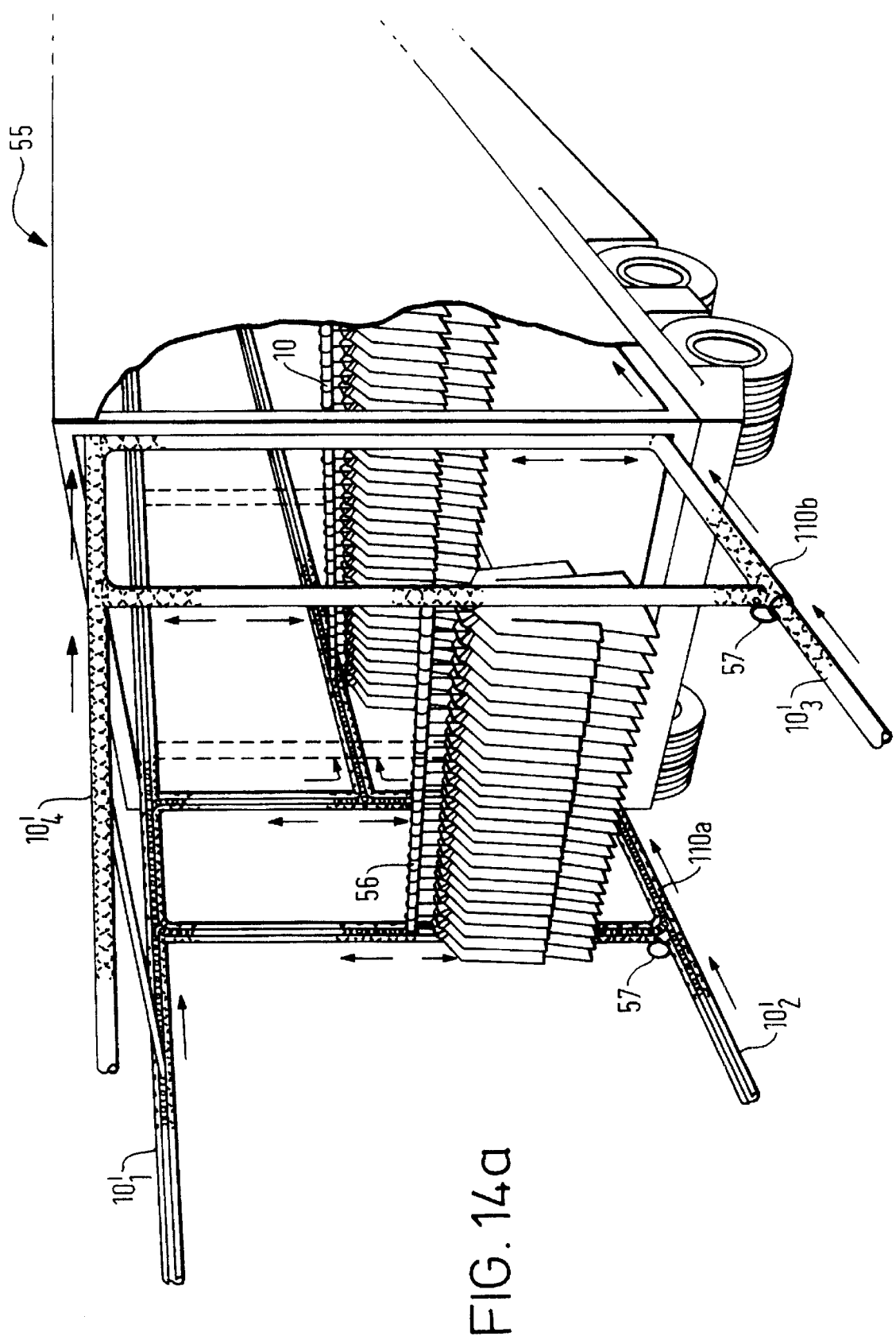

Referring now to FIG. 14a, a vehicle 55 such as that shown in FIG. 13 is shown in greater detail.

Vehicle 55 includes formed therein a further three dimensional array of the constraining guides 10. In the embodiment shown, the constraining guides permit vertical movement of intermediate, connecting bars 56 and horizontal movement of such bars along the interior of the vehicle, as desired.

Two portions 110a and 110b are hingeably secured to the three dimensional array formed within the lorry. The hingeable portions 110a and 110b may be hinged outwardly from an initial, flush position to protrude from the rear of the vehicle for engagement with the outer, open ended portions $10'_1$, $10'_2$, $10'_3$, $10'_4$ of the three dimensional array in the warehousing building 54.

If desired, the hingeable portions 110a, 110b may be secured to or formed within the rear doors of the vehicle.

Alternatively the portions 110a, 110b may be slideable into and out of the vehicle. In such cases the portions 110a, 110b retain the orientation shown throughout their movements.

The free ends of the portions $10'_1$, $10'_2$, etc include gate members 57 that in the embodiment shown are simple pins inserted through aligned holes formed in opposite sides of the constraining guide 10, to prevent the drive-transferring members 11 from falling out of the apertures at the ends of the constraining guide portions $10'_1$, $10'_2$, etc.

If desired, flexible portions may be included in such parts of the constraining guide to ensure mating of the hingeable portions 110a, 110b with the corresponding junctions defined at the free ends of the constraining guide.

The hingeable portion and/or the free ends $10'_1$, $10'_2$, etc. may if necessary include clips or other means of securing them to the portions of constraining guide that abut them on manoeuvring of the vehicle 55 to a loading or unloading position.

Although the arrangement shown in FIG. 14a concerns loading of goods onto a vehicle, it will be appreciated that a similar arrangement may be employed for unloading of the vehicle when it reaches its destination.

The vehicle 55 may include a microprocessor or other controller device for routing the garments, eg. as supported on the bars 56, within the vehicle in dependence on encoding of the drive-transferring members 11 or further members secured thereto.

Such an arrangement may permit organisation of goods within the vehicle as it travels, thereby speeding unloading of goods at the vehicle's destination.

An alternative array of constraining guides in a vehicle 54 is shown in FIG. 14b.

In this arrangement the deck of the vehicle contains a grid-like array of interconnected constraining guides 10, the interconnections including junctions as necessary such as junctions 27, 29 and 30 of FIG. 8.

Figure 14C:
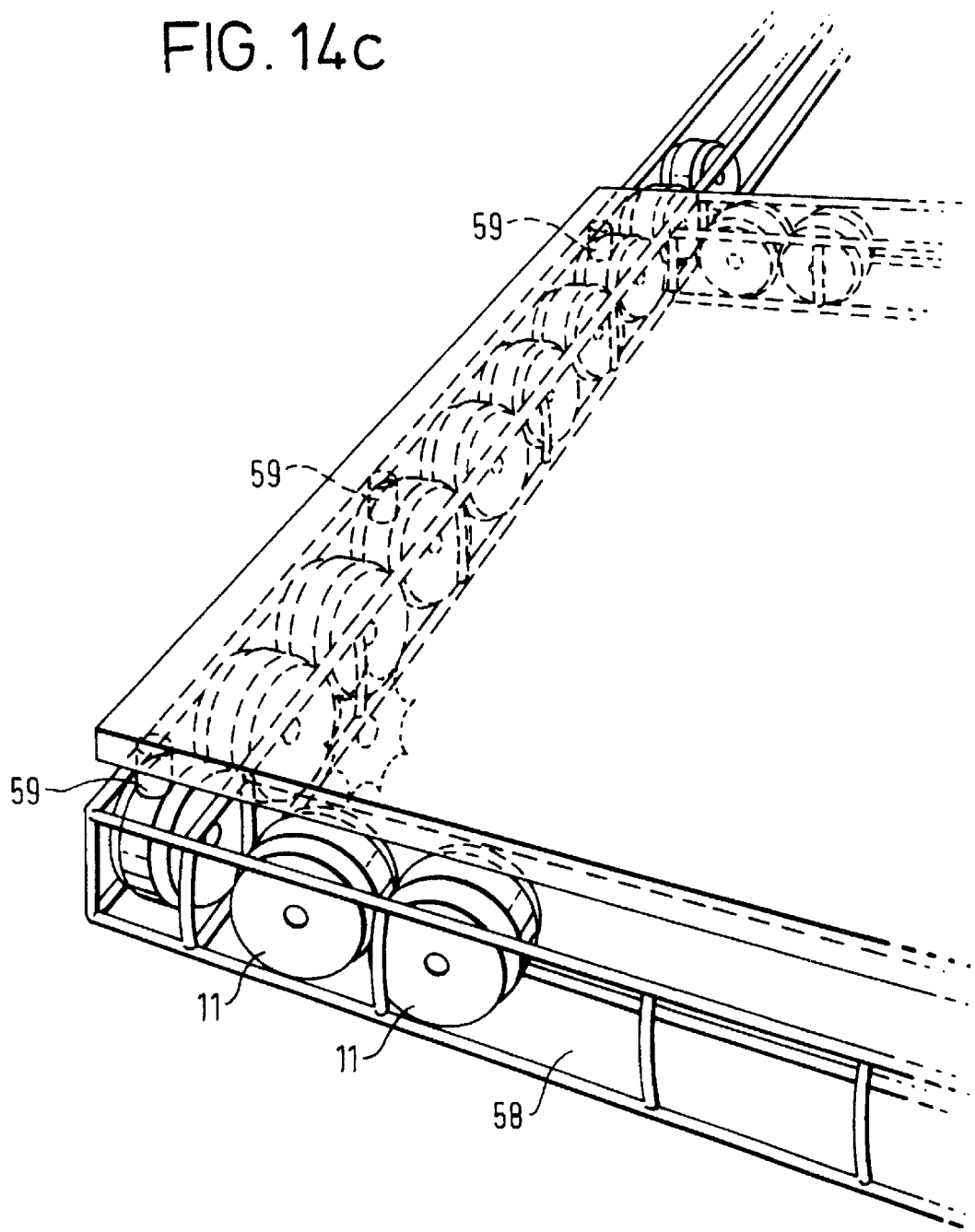
Figure 14D:
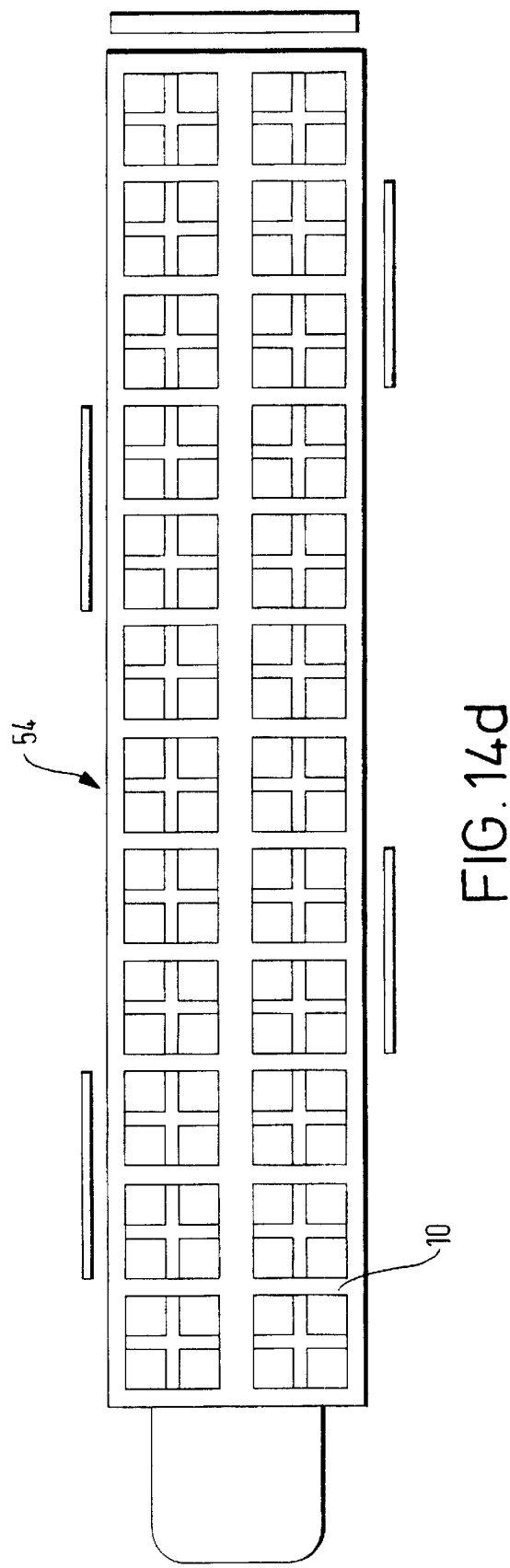

FIG. 14d shows the floor plan of the vehicle, that optionally includes side doors that permit rapid unloading of the vehicle. The side doors minimise the movement of goods needed within the vehicle to achieve speedy unloading.

This arrangement is intended to support a pallet such as pallet 58 of FIG. 14c.

Pallet 58 includes a plurality of selectively downwardly moveable members 59 for engagement with selected drive-transferring members 11 in the array of constraining guide 10.

Depending on encoding of either the pallet or the drive-transferring members, the pallet may drivingly engage predetermined drive-transferring member 11 in order to move the pallet within the vehicle.

If desired, one or more grid squares of the array shown in FIG. 14b may be left blank to provide room for manoeuvring the pallets within the vehicle.

Alternatively, a grid extension 60 (optionally supported on leg 61) of constraining guide members 10 may project from eg. the rear of the vehicle to provide such space for manoeuvring.

FIG. 14b also shows an equivalent array of constraining guides 10''' at an upper level within the body of the vehicle 54, for manoeuvring pallets 58 in a second tier within the vehicle.

If desired, the entire array of upper constraining guide 10''' can be height-adjustable on eg. suitable hoist motors within the vehicle 54.

The computer control may if desired be operable on the upper tier of drive-transferring members as well.

Furthermore, suitable extensions 60'' may be provided to permit manoeuvring of the pallets 58 on the upper tier.

As in the embodiment of FIG. 14a, the constraining guides 10 of FIGS. 14b and 14c may if desired be connectable to eg. the free ends 10'$_1$,10'$_2$, 10'$_3$ as shown in FIG. 14a.

Figure 15A:
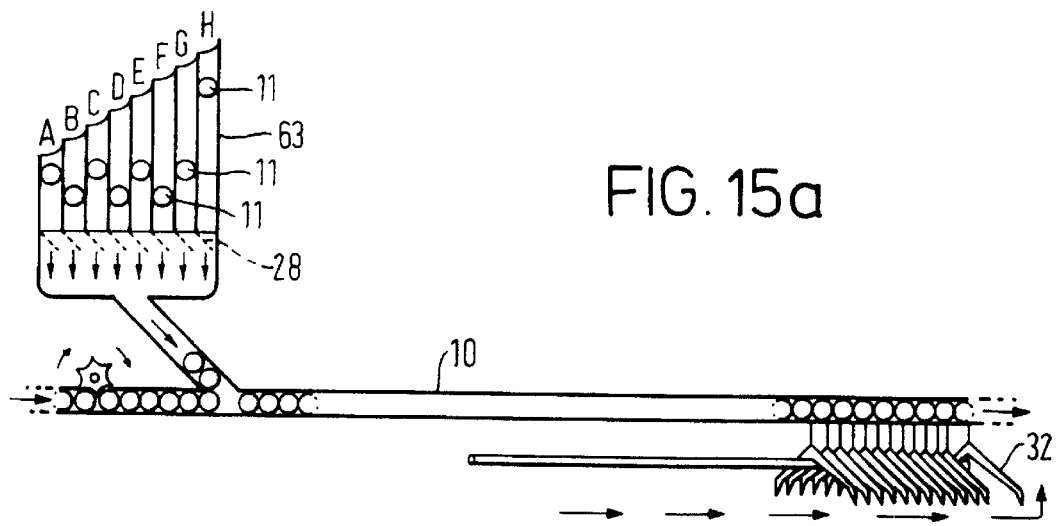
FIGS. 15a and 15b show a possible reservoir of drive-transferring members.
Figure 15B:
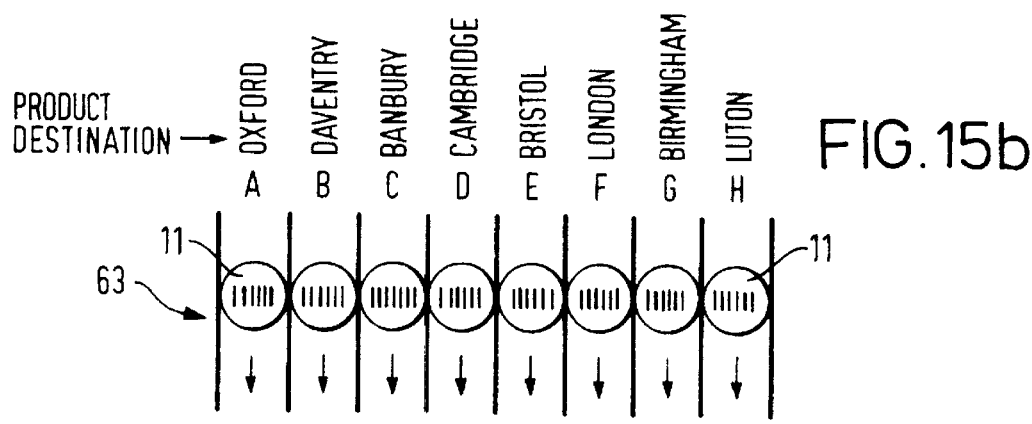

Referring now to FIGS. 15a and 15b, there is shown a reservoir 63 of encoded drive-transferring members 11 for use in a warehouse, factory or vehicle based environment such as those of FIGS. 13 to 14.

As is shown in detail in FIG. 15b, the reservoir 63 is subdivided into a plurality of compartments. Each compartment contains a plurality of drive-transferring members 11 encoded in a predetermined way, eg. to indicate to a control device controlling operation of the apparatus of the invention the destination of goods to be carried by the apparatus. This is shown schematically in FIG. 15a.

A plurality of gate members such as gate members 28 as described hereinabove, may selectively control the feeding of drive-transferring members into the constraining guide 10. This may be achieved eg. in dependence on intervention by the operator of a garment manufacturing or finishing machine may on completion of each garment indicate the kind of drive-transferring member 11 (in terms of its encoding) to be added to the constraining guide 10, prior to attachment of the garment hanger 32 for the most recently completed garment thereto. In this way, within seconds of their manufacture or finishing the garments are associated with drive-transferring members of the apparatus of the invention that are encoded as to their destinations. Such encoding may be carried with the garments throughout their journeys to final destinations, such journeys possibly embracing travel through warehouse-based systems as shown in FIG. 13 and in vehicles such as those of FIG. 14.

Figure 16:
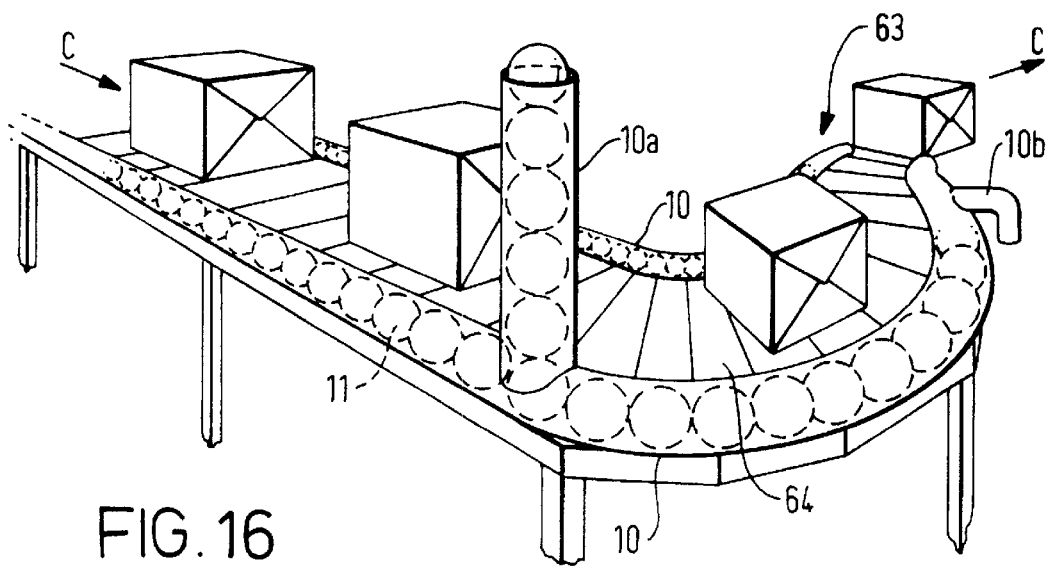
FIGS. 16 and 17 show flat bed conveyors embodying the principles of the invention.

Referring now to FIG. 16, there is shown a flatbed conveyor powered by a pair of constraining guides 10 according to the invention.

Flatbed conveyor 63 includes a plurality of horizontal slats or plates 64 secured one adjacent another on a pair of parallel, mutually spaced constraining guides 10 according to the invention.

Each of the slats or plates 64 is slidingly engaged on its underside with one or more of the drive-transferring members 11 of one or both the constraining guides 10 shown in FIG. 16.

The slats or plates 64 may be linked together eg. by means of sliding links, or may be mutually disconnected from one another.

The key advantage of using constraining guides according to the invention in the FIG. 16 embodiment is that the constraining guides may be driven at different speeds from one another when it is required to drive the flatbed conveyor 63 around a bend as shown.

A branch 10a of the constraining guide stands at the infeed to the bend negotiated by the outer constraining guide. Constraining guide branch 10a feeds additional drive-transferring members 11 into the constraining guide, in order to permit faster travel of the outer part of the flatbed conveyor in the vicinity of the bend. At the termination of the bend, a further branch 10b of the constraining guide 10 may remove the excess constraining guides in order to permit the two constraining guides 10 to follow a straight line path at the same speed.

For the avoidance of doubt, in the FIG. 16 embodiment, the flatbed conveyor 63 travels in the direction of the arrows C.

Suitable gates such as gate members 28 may be employed at the junctions between the branch portions 10a and 10b and the main constraining guide forming the outer part of the curve.

Figure 17:
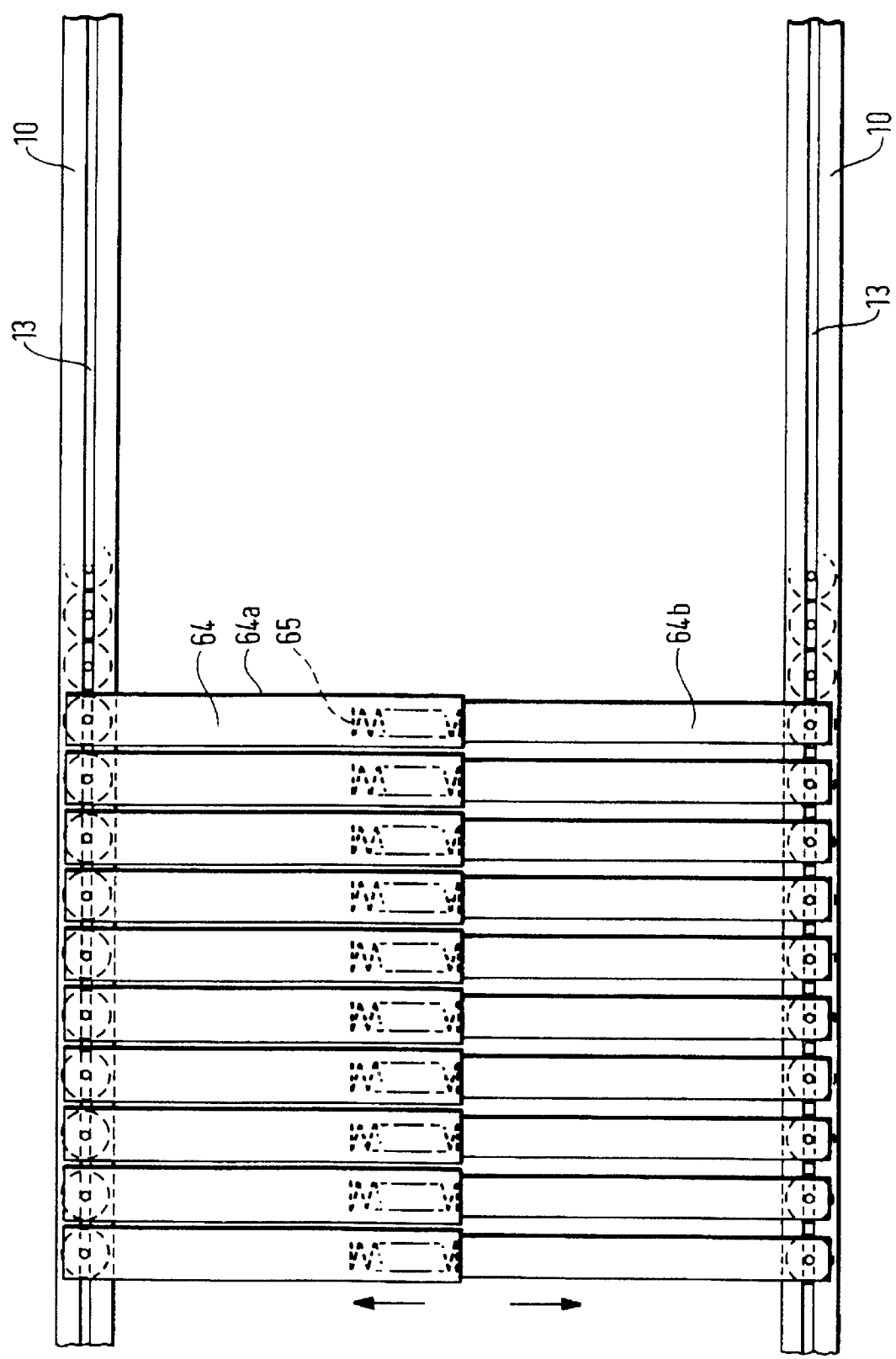

As shown in FIG. 17, the slats or plates 64 may be constructed in two portions 64a, 64b. One of the two portions 64a may be hollow for receiving the free end of the other portion 64b of the slat 64. A resilient connection indicated schematically by spring 65 may permit resilient compression and/or extension of the elongate length of each slat or plate 64. This allows the slats or plates to accommodate changes in the spacing between the two constraining guides 10 visible in FIG. 17.

Thus the apparatus of the invention permits construction firstly of a conveyor that is able to negotiate bends through use of variable speed drives as shown in FIG. 16; and secondly of a conveyor the width of which may vary in dependence on the spacing between the pair of constraining guides 10.

Hitherto it has not been possible to devise a powered conveyor the width of which varies at different points about its travel.

FIG. 18 shows in plan view a typical conveyor layout for use eg. in a packing area or product finishing area of a factory or warehouse.

The constraining guides 10 are shown schematically, as are the branches 10a and 10b of FIG. 16. The slats or plates 64 of the conveyor are omitted from FIG. 18 for clarity.

A further layout of constraining guide members 10 is shown in FIG. 19. In this figure there is a main constraining guide loop 10 driven by a main drive member 13 driven by a motor (not visible in FIG. 19).

A branch loop 10c may selectively divert drive-transferring members 11 from the main loop 10 and may pass through eg. a protective wall 66 into a hazardous area, a clean room, or other processing area 67 to which human access is normally denied.

In the embodiment shown, there is a single constraining guide (as compared with the parallel pair of constraining guides of eg. FIG. 18), that in the processing area 67 passes about the periphery of a rotatable table or dais 68. Contact of the drive-transferring members of the branch loop constraining guide 10c with a suitable surface formed in the periphery of the rotatable dais 68 may cause driven rotation thereof. If necessary, a further driven member represented schematically at 13c may be provided to power the drive-transferring members around the branch loop 10c to achieve this.

The drive-transferring members 11 may transfer their drive in other ways as desired within the processing area 67.

Referring now to FIG. 20a, there is shown a vehicle comprising a framework 70 constituted predominantly of constraining guides 10 of apparatus according to the invention.

The constraining guides 10 of the framework 70 are in the embodiment shown each formed as parallel, mutually spaced polygonal shapes rigidly interconnected by struts 71 disposed at intervals about the periphery of the polygonal shape visible in FIG. 20a.

Each constraining guide 10 includes a junction 72 that may be similar to those eg. on the hingeable portions of the constraining guides of FIG. 14, for connection with further constraining guide portions 10 conveying goods from eg. a factory or warehouse.

In the embodiment shown, such constraining guides extend in parallel, and pairs of drive-transferring members 11 in the respective parallel constraining guides are interconnected by rigid rods 72 that each have suspended therefrom a goods tray 73.

It will be apparent that by connecting the constraining guides 10 constituting the bulk of frame 70 of the vehicle of FIG. 20a, the goods trays 73 may be conveyed onto the vehicle for rotation either by means of a motor or by hand about the periphery of frame 70. This permits eg. a worker shown schematically at 74 to fill or empty the trays as desired.

FIG. 20b shows one way in which the rods 72 may be received in the drive-transferring members 11. In FIG. 20b the elongate slot 13 of the constraining guide 10 faces horizontally to receive the horizontally extending rod 72. If necessary, a detent may be employed to retain the end of the rod 72 in an aperture formed in the drive-transferring member 11 that in the embodiment shown is formed as spherical element.

In the FIG. 20b embodiment, the portion of the rod 72 interconnecting the two drive-transferring members is dispensed with. Interconnection of the drive-transferring members 11 is achieved through rigidity of the tray 73.

FIG. 20a also shows a cap 76 that may be used to close the free end of the constraining guides 10 when the vehicle is moved away from the position shown. The vehicle includes wheels for this purpose.

Figure 21A:
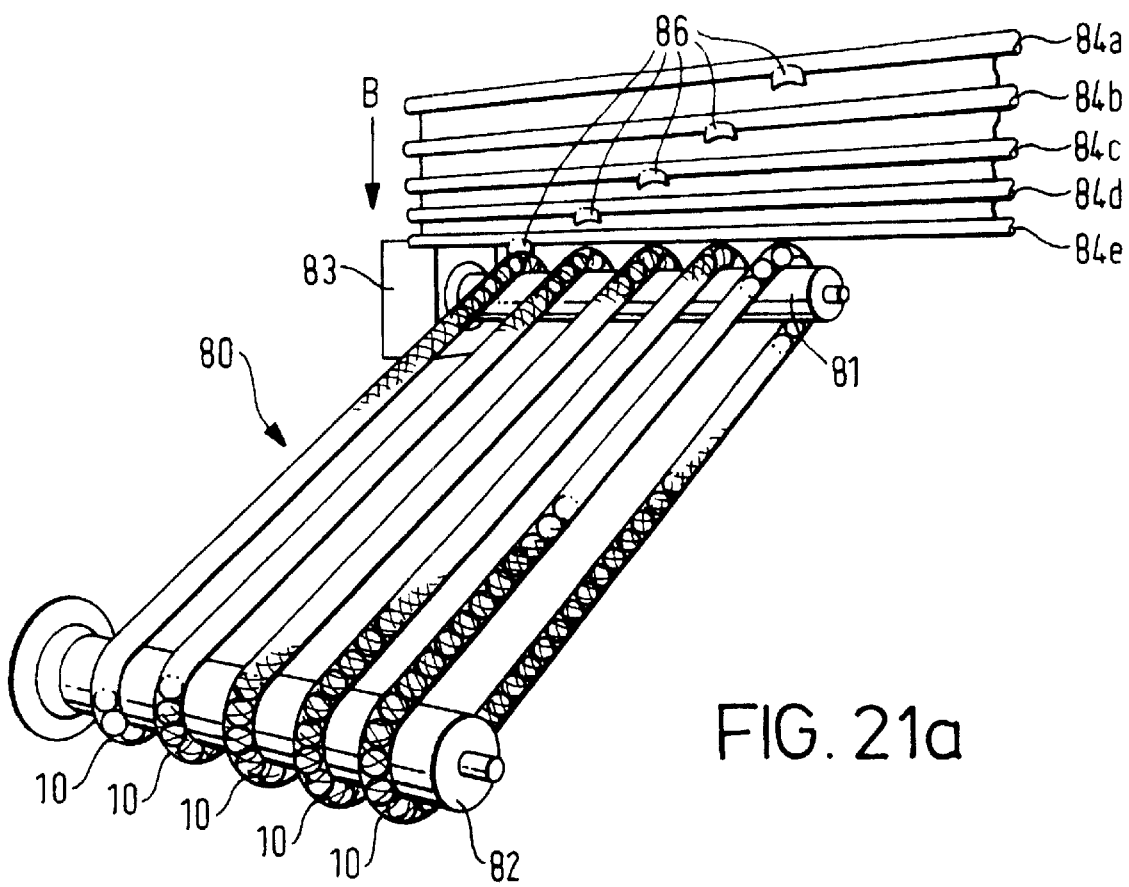
FIGS. 21a and 21b show a motor according to the invention.
Figure 21B:
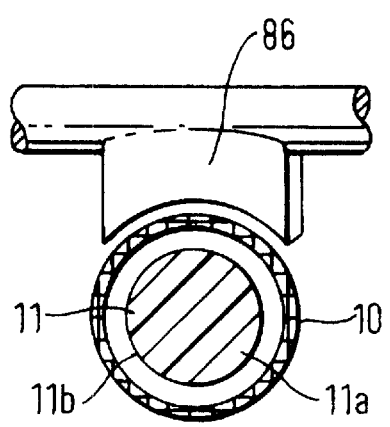

FIGS. 21a and 21b show the apparatus of the invention configured as a motor 80.

In this embodiment, a plurality of the constraining guides 10 extend parallel to one another and are each looped about respective, spaced rollers 81, 82.

As shown in FIG. 21b, in this embodiment slot 13 is omitted from constraining guide 10. Instead, the wall of constraining guide 10 is manufactured from an open mesh-like material that permits contact between the drive-transferring members 11 and further members exposed outside the constraining guide 10.

It will thus be appreciated that if roller 81 is driven eg. by means of electric motor 83, the rotation of roller 81 is transferred to linear motion of the drive-transferring members 11. Since the drive-transferring members travel from roller 81 to roller 82, as they pass over roller 82 their drive is transferred to roller 82 that is thereby caused to rotate.

A series of brake members 84 may be selectively brought into contact with the constraining guides 10 shown in FIG. 21b. The lowermost brake member 84e may be arranged to contact only the extreme left hand constraining guide visible in FIG. 21b; the next uppermost may be arranged only to contact the constraining guide immediately to the right thereof, and so on, whereby on lowering the brake members downwardly in the direction of arrow B in FIG. 21 the constraining guides may be successively slowed or brought to a stop. This in turn reduces the energy transferred to roller 82 in a progressive manner, thereby slowing or stopping it as desired.

The brake members 84a may be mounted on a lever or may be actuated by means of eg. a solenoid or other motor, if necessary in dependence on control signals generated in eg. a microprocessor or other controller.

Each brake member may include a brake pad 86 (best shown in FIG. 21b) offset laterally from the brake pad in a neighbouring brake member whereby to dedicate a given brake member 84 to the slowing or stopping of the drive-transferring members in a predetermined constraining guide 10.

As shown in FIG. 21b, the drive-transferring members 11 preferably have a rigid central zone surrounded by a deformable outer coating.

The mesh-like outer covering of the constraining guides 10 shown in FIG. 21 may for example be supplied for safety purposes over the rods 50 of FIG. 12, thereby preventing articles from becoming entrained or trapped in the constraining guide thereof. In such an arrangement, the mesh may be of a closer weave whereby to prevent access of eg. human digits to the drive-transferring members 11.

Figure 22:
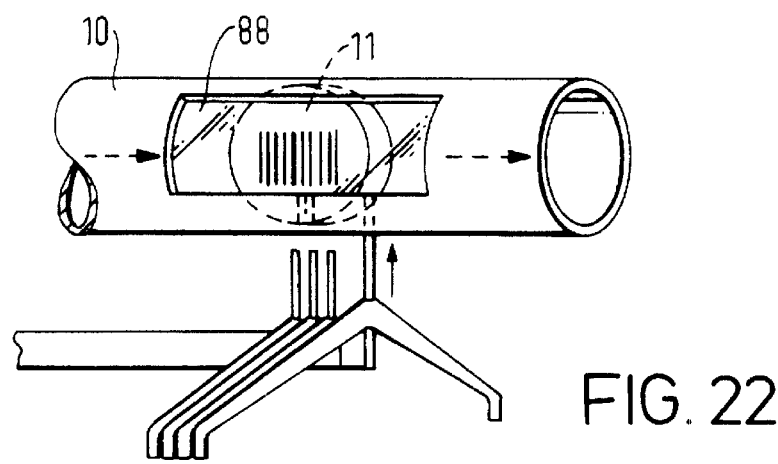
FIG. 22 shows an optional feature of the constraining guide.

Referring now to FIG. 22, there is shown a window 88 formed in a portion of a constraining guide 10 according to the invention. Window 88, which may be covered eg. by a perspex material, permits reading of optical encoding information that is carried directly on the drive-transferring member 11 visible in FIG. 22. Such encoding information (which may be in the form of bar codes or other optical codes) may be printed directly onto the drive-transferring member, or may be carried by eg. a sticker secured to the drive-transferring member.

The window 88 may also permit eg. the reading of a radio frequency identification tag secured to the drive-transferring member 10.

The readers for the bar codes and/or radio frequency or other identification tags, may if desired be enclosed within coils 25 of the constraining guide 10 as shown in FIG. 8. Thus the code reading apparatus may be protected against damage and contamination, and the windows 88 may also be protected against damage. When the windows 88 do not include a cover such as a sheet of perspex or glass, their positioning on the inner face of a coil such as coils 25 or 25a prevents inadvertent contact of other objects with the drive-transferring members 11. Thus the safety of the apparatus is assured.

Figure 23:
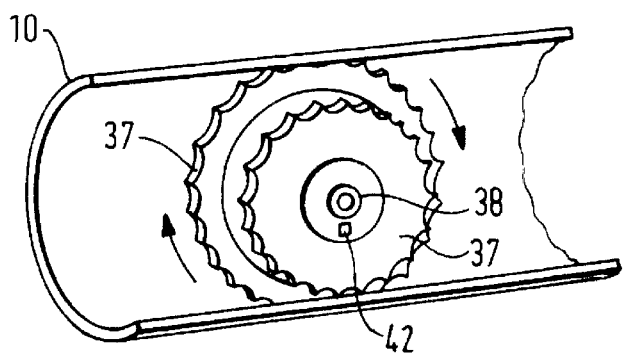
FIG. 23 shows an embodiment of drive-transferring member.

FIG. 23 shows an alternative design of the drive-transferring member 11 shown eg. in FIG. 10. In this embodiment the rollers 37 have a roughed or serrated outer periphery, for gripping the interior of the constraining guide 10.

FIG. 23 also shows one possible location for the radio frequency identification tag 42. As shown, the tag is located in the hub of the axle 38.

Figure 24:
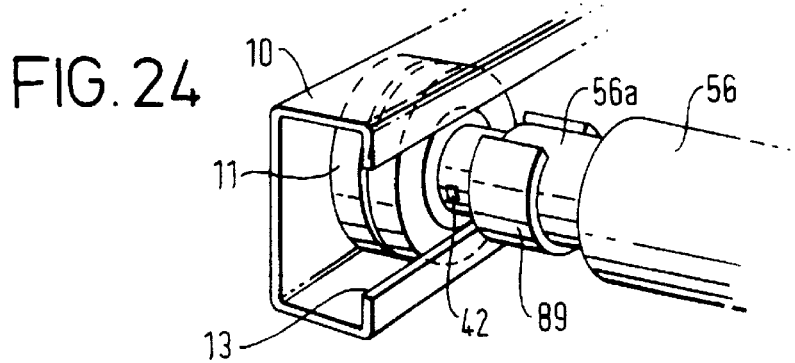
FIG. 24 shows a further embodiment of drive-transferring member.

In FIG. 24, there is shown an arrangement by which the bars 56 of the FIG. 14a arrangement may be supported relative to the drive-transferring members 11. As shown, each drive-transferring member 11 has projecting outwardly therefrom a cup 89 that protrudes beyond the slot 13 of constraining guide 10 in a horizontal direction. Each bar 56 has a reduced diameter portion 56a at either end that is receivable under the action of gravity in the cup 89, whereby to support the bar 56 at either end. When the drive-transferring members 11 are computer controlled, it is possible to maintain the bars 56 horizontal throughout their travel.

Any of the optional embodiments described herein in relation to FIGS. 1 to 24 may be employed on their own, or in conjunction with others of the optional embodiments as desired.

The components of the invention may be manufactured from a variety of materials, as appropriate. For example, the components may be manufactured from materials suitable for use in different industries such as the food industry, chemical processing industry and the pharmaceutical industry. Corrosion free (eg. non-metallic) materials may be employed as appropriate.

The constraining guides 10 may be manufactured from flexible materials or rigid material as desired.

Self-lubricating materials may also be used as appropriate. For example, sintered materials that dispense lubricants as they wear may be employed for the interior of the constraining guide 10 and, optionally, for the drive-transferring members 11.

The windows 88 may also be used to indicate the completion of actions eg. in process plant. For example, the presence of an encoded drive-transferring member in a chosen window 88 may indicate the the lapsing of a predetermined amount of time from the completion of a previous process, by virtue of travel of the drive-transferring members 11 a predetermined distance along the constraining guides 10.

Reservoirs for receiving drive-transferring members 11 from and supplying drive-transferring members 11 to the constraining guides 10 may be operatively connected to the constraining guides 10 at suitable locations, as desired. In the case of the vehicles of FIG. 14, the reservoirs may be located eg. under the floor of the vehicle, where there is conventionally a significant "dead" space.

What is claimed is:

1. A drive-transferring apparatus, comprising:
   a drive assembly;
   a constraining guide defining a drive-transfer path; and
   a plurality of non-permanently connected drive-transferring members movably captive in the constraining guide for movement along the drive-transfer path and drivably engaged with the drive assembly, wherein:
   (i) the constraining guide includes at least one aperture permitting engagement of the drive-transferring members with at least one load support for articles in a drive-transferring manner;
   (ii) at least a plurality of the drive-transferring members are compressively interengaged for transferring drive from one drive-transferring member to the next along the drive-transfer path; at least a plurality of the compressively interengaged drive-transferring members being nonrotatable and slidable along the constraining guide, the drive-transferring members being moved by an external drive means; and
   (iii) at least one of the drive-transferring members includes means for conveying information relating to the drive-transferring members to a receiver for further processing.

2. A conveyor, comprising:
   a constraining guide defining a drive-transfer path;
   a plurality of non-permanently connected drive-transferring members movably captive in the constraining guide and movable along the drive-transfer path; and
   a drive assembly operable to engage at least one of the drive-transferring members to move the plurality of drive-transferring members; wherein:
   (i) the constraining guide includes at least one aperture permitting engagement of the drive-transferring members with at least one load support for articles in a drive-transferring manner;
   (ii) the drive-transferring members are movable by means of compressive interconnection, and at least a portion of each of at least a plurality of the drive-transferring members is nonrotatable, and moves by translation relative to the constraining guide, the drive-transferring members being moved by an external drive means; and
   (iii) at least one of the drive-transferring members includes means for conveying information relating to the drive-transferring members to a receiver for further processing.

3. A conveyor, comprising:
   a constraining guide defining a drive-transfer path;
   a plurality of non-permanently connected drive-transferring members movably captive in the constraining guide and movable along the drive-transfer path; and
   a drive assembly operable to engage at least one of the drive-transferring members to move the plurality of drive-transferring members; wherein:
   (i) the constraining guide includes at least one aperture permitting engagement of the drive-transferring members with at least one load support for articles in a drive-transferring manner;
   (ii) the drive-transferring members are movable by means of compressive interconnection via an external drive means, each drive-transferring member having a nonrotatable body and at least one roller that is captured in the constraining guide and that supports the nonratatable body, the nonrotatable body projecting beyond the radius of the at least one roller to engage a nonrotatable body of an adjacent drive-transferring member; and
   (iii) at least one of the drive-transferring members includes means for conveying information relating to the drive-transferring members to a receiver for further processing.

4. A conveyor according to claim 3 wherein the constraining guide defines an endless loop.

5. A conveyor according to claim 3 wherein the constraining guide is elongate.

6. A conveyor according to claim 5 wherein an aperture in the constraining guide is elongate and generally parallel to the axis of elongation of the constraining guide.

7. A conveyor according to claim 6 wherein the constraining guide is a channel-section member.

8. A conveyor according to claim 3 wherein a plurality of the drive-transferring members are substantially contiguous with one another in the constraining guide when at rest.

9. A conveyor according to claim 8 wherein the plurality of drive-transferring members form a substantially contiguous line of such members in the constraining guide.

10. A conveyor according to claim 3 wherein each drive-transferring member includes means for transmitting information.

11. A conveyor according to claim 10 wherein the means for transmitting information includes an optical code.

12. A conveyor according to claim 11 wherein the optical code is a bar code.

13. A conveyor according to claim 11 wherein the bar code is secured on the drive-transferring member.

14. A conveyor according to claim 10 wherein the constraining guide includes an opening permitting detection of the optical code.

15. A conveyor according to claim 10 wherein the drive-transferring member includes a further member supporting the means for transmitting information.

16. A conveyor according to claim 15 wherein the further member is detachably secure to the drive-transferring member.

17. A conveyor according to claim 3 wherein each drive transferring member is of a shape generally complementary to the cross-sectional shape of the constraining guide, whereby to facilitate movement of the drive-transferring members in the constraining guide.

18. A conveyor according to claim 10, wherein the drive-transferring members have s apes which are selected from a group of generally spherical and generally spheroidal shapes.

19. A conveyor according to claim 3 wherein at least one of the drive-transferring members is engageable, via the at least one aperture in the constraining guide, with at least one further member to cause motion of the further member.

20. A conveyor according to claim 19, wherein at least one of the drive-transferring members includes a detent, accessible via the at least one aperture in the constraining guide, for engaging said further member.

21. A conveyor according to claim 19, wherein said further member is capable of supporting goods for transportation on the conveyor.

22. A conveyor according to claim 3 wherein the drive assembly includes a powered member capable of imparting motion to a plurality of the drive-transferring members in succession.

23. A conveyor according to claim 22 wherein the powered member protrudes via an aperture in the constraining guide to drivingly contact the drive-transferring members.

24. A conveyor according to claim 22 wherein the powered member includes a drivingly rotatable star wheel having points engageable with the drive-transferring members.

25. A conveyor according to claim 22 wherein the powered member includes a toothed s rocket drivingly engageable with the drive-transferring members.

26. A conveyor according to claim 22 including a plurality of said powered members.

27. A conveyor according to claim 22 including a controller for controlling operation of the powered member.

28. A conveyor according to claim 3, wherein the constraining guide is branched.

29. A conveyor according to claim 3 including at least one source of drive-transferring members for adding drive-transferring members to the constraining guide.

30. A conveyor according to claim 29 wherein said source of drive-transferring member comprises a further constraining guide supporting at least one drive-transferring member in an interior portion communicating with the interior of said constraining guide.

31. A conveyor according to claim 3 wherein the constraining guide includes a least one aperture permitting removal of drive-transferring members from the constraining guide.

32. A conveyor according to claim 31 wherein the at least one aperture permitting removal of drive-transferring members is closeable.

33. A conveyor according to claim 32 including a receptacle connected to the constraining guide for drive-transferring members removed from the constraining guide.

34. A conveyor according to claim 3, wherein at least a portion of the constraining guide is rigid.

35. A conveyor according to claim 3 wherein the means for conveying information is supported on an axle of a drive-transferring member.

36. A conveyor according to claim 3 wherein said means for conveying information includes a portion that protrudes via the at least one aperture in said constraining guide, and aid portion carries encoded data.

37. A conveyor according to claim 36 wherein said portion includes a detachably secured part.

38. A conveyor according to claim 37 wherein the said portion includes means for supporting a further member.

39. A conveyor according to claim 3, wherein at least a portion of the constraining guide extends downwardly and has a substantially helical shape.

* * * * *